US012330423B2

(12) United States Patent
Horade et al.

(10) Patent No.: US 12,330,423 B2
(45) **Date of Patent: *Jun. 17, 2025**

(54) INKJET RECORDING APPARATUS WITH COVER AND METHOD THEREFOR INCLUDING INQUIRY AND NOTIFICATION FEATURES

(71) Applicant: BROTHER KOGYO KABUSHIKI KAISHA, Nagoya (JP)

(72) Inventors: Kenta Horade, Tokai (JP); Mana Honoki, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,068

(22) Filed: Jan. 18, 2024

(65) Prior Publication Data

US 2024/0269984 A1 Aug. 15, 2024

Related U.S. Application Data

(63) Continuation of application No. 17/464,775, filed on Sep. 2, 2021, now Pat. No. 11,919,314, which is a (Continued)

(30) Foreign Application Priority Data

Jan. 21, 2015 (JP) ................................ 2015-009873

(51) Int. Cl.
*B41J 2/175* (2006.01)
*B41J 29/02* (2006.01)
(Continued)

(52) U.S. Cl.
CPC .......... *B41J 2/17509* (2013.01); *B41J 2/175* (2013.01); *B41J 2/17506* (2013.01);
(Continued)

(58) Field of Classification Search
None
See application file for complete search history.

(56) References Cited

U.S. PATENT DOCUMENTS 4,380,019 A 4/1983 Steinberger et al.
6,007,174 A 12/1999 Hirabayashi et al.
(Continued)

FOREIGN PATENT DOCUMENTS

CN 102285240 A 12/2011
CN 102371771 A 3/2012
(Continued)

OTHER PUBLICATIONS

Filing Documents of U.S. Appl. No. 15/637,390.
(Continued)

*Primary Examiner* — Justin Seo
(74) *Attorney, Agent, or Firm* — Merchant & Gould P.C.

(57) ABSTRACT

An inkjet recording apparatus includes a tank, a recording head, a cover, a monitor, a cover sensor, an operation panel, and a controller. The cover is movable to cover a plurality of injection inlets associated with a plurality of ink chambers and to expose the plurality of injection inlets. The cover sensor outputs signal depending on position of the cover. The controller controls the monitor to display one of inquiry information and notification on the monitor depending on receipt of the signal from the cover sensor.

7 Claims, 13 Drawing Sheets

Related U.S. Application Data continuation of application No. 16/424,575, filed on May 29, 2019, now Pat. No. 11,110,712, which is a continuation of application No. 15/405,415, filed on Jan. 13, 2017, now Pat. No. 10,328,705, which is a continuation of application No. 15/001,375, filed on Jan. 20, 2016, now Pat. No. 9,550,365.

(51) Int. Cl.
*B41J 29/13* (2006.01)
*B41J 29/38* (2006.01)

(52) U.S. Cl.
CPC ....... *B41J 2/17513* (2013.01); *B41J 2/17523* (2013.01); *B41J 2/17566* (2013.01); *B41J 29/02* (2013.01); *B41J 29/13* (2013.01); *B41J 29/38* (2013.01); *B41J 2002/17569* (2013.01)

(56) References Cited

U.S. PATENT DOCUMENTS

| | | | |
|---|---|---|---|
| 6,065,831 | A | 5/2000 | Kawaura et al. |
| 6,116,722 | A | 9/2000 | Sato et al. |
| 6,174,042 | B1 | 1/2001 | Kobayashi et al. |
| 6,447,084 | B1 | 9/2002 | Uetsuki et al. |
| 6,561,635 | B1 | 5/2003 | Wen |
| 6,871,925 | B2 | 3/2005 | Yamamoto et al. |
| 7,099,779 | B2 | 8/2006 | Niki |
| 7,283,258 | B1 | 10/2007 | Kuno et al. |
| 7,309,121 | B2 | 12/2007 | Hatasa et al. |
| 7,971,946 | B2 | 7/2011 | Uehara |
| 8,147,021 | B2 | 4/2012 | Nishizaka et al. |
| 8,371,673 | B2 | 2/2013 | Maru et al. |
| 8,496,309 | B2 | 7/2013 | Kura |
| 8,506,060 | B2 | 8/2013 | Tamaki |
| 8,770,689 | B2 | 7/2014 | Igarashi |
| 8,919,904 | B2 | 12/2014 | Shirakawa et al. |
| 8,988,697 | B2 | 3/2015 | Kai |
| 9,085,136 | B2 | 7/2015 | Yatsunami |
| 9,573,380 | B2 | 2/2017 | Ishida et al. |
| 9,579,913 | B2 | 2/2017 | Honoki |
| 9,604,464 | B2 | 3/2017 | Honoki |
| 9,623,691 | B2 | 4/2017 | Honoki et al. |
| 9,694,612 | B2 | 7/2017 | Honoki |
| 9,868,283 | B2 | 1/2018 | Misumi et al. |
| 9,868,293 | B2 | 1/2018 | Honoki et al. |
| 10,086,618 | B2 | 10/2018 | Michallon |
| 10,131,167 | B2 | 11/2018 | Honoki et al. |
| 10,471,751 | B2 | 11/2019 | Honoki et al. |
| 11,325,406 | B2 | 5/2022 | Honoki et al. |
| 11,919,314 | B2 | 3/2024 | Honoki |
| 2001/0033307 | A1 | 10/2001 | Kohno |
| 2001/0035887 | A1 | 11/2001 | Altfather et al. |
| 2003/0112457 | A1 | 6/2003 | Akyama et al. |
| 2004/0070642 | A1 | 4/2004 | Murakami et al. |
| 2004/0233245 | A1 | 11/2004 | Matsumoto et al. |
| 2005/0034777 | A1 | 2/2005 | Nicodem et al. |
| 2005/0140705 | A1 | 6/2005 | Godil et al. |
| 2006/0071952 | A1 | 4/2006 | Motominami et al. |
| 2006/0119671 | A1 | 6/2006 | Ha |
| 2007/0019011 | A1 | 1/2007 | Sugimoto |
| 2008/0252670 | A1 | 10/2008 | LaBar |
| 2008/0310940 | A1 | 12/2008 | Yamada |
| 2010/0026741 | A1 | 2/2010 | Gold et al. |
| 2010/0157003 | A1 | 6/2010 | Edwards |
| 2010/0329704 | A1 | 12/2010 | Tachibana |
| 2011/0310198 | A1 | 12/2011 | Honoki |
| 2012/0044285 | A1 | 2/2012 | Ogasawara et al. |
| 2012/0050359 | A1 | 3/2012 | Koganehira et al. |
| 2012/0092716 | A1 | 4/2012 | Ichimura et al. |
| 2012/0127229 | A1 | 5/2012 | Fukasawa et al. |
| 2012/0294634 | A1 | 11/2012 | Nishikawa |
| 2013/0016153 | A1 | 1/2013 | Yamaguchi et al. |
| 2014/0104347 | A1 | 4/2014 | Iizawa |
| 2014/0104349 | A1 | 4/2014 | Kimura et al. |
| 2015/0109379 | A1 | 4/2015 | Koike et al. |
| 2015/0224783 | A1 | 8/2015 | Koganehira et al. |
| 2015/0298461 | A1 | 10/2015 | Koganehira et al. |
| 2015/0367647 | A1 | 12/2015 | Teramoto et al. |
| 2016/0052288 | A1 | 2/2016 | Kondo et al. |
| 2016/0059571 | A1 | 3/2016 | Kobayashi |
| 2016/0207319 | A1 | 7/2016 | Shirono |
| 2016/0207336 | A1 | 7/2016 | Horade et al. |
| 2016/0207337 | A1 | 7/2016 | Honoki |
| 2016/0207338 | A1 | 7/2016 | Honoki |
| 2016/0207339 | A1 | 7/2016 | Honoki |
| 2016/0214392 | A1 | 7/2016 | Honoki |
| 2016/0214393 | A1 | 7/2016 | Matsui et al. |
| 2016/0279962 | A1 | 9/2016 | Ishida et al. |
| 2016/0279963 | A1 | 9/2016 | Koganehira et al. |
| 2016/0303857 | A1 | 10/2016 | Genta et al. |
| 2017/0113469 | A1 | 4/2017 | Tanaka et al. |
| 2017/0165989 | A1 | 6/2017 | Honoki |
| 2017/0246895 | A1 | 8/2017 | Honoki et al. |
| 2017/0274665 | A1 | 9/2017 | Honoki et al. |
| 2018/0001682 | A1 | 1/2018 | Honoki |

FOREIGN PATENT DOCUMENTS

| | | | |
|---|---|---|---|
| CN | 102886988 | A | 1/2013 |
| CN | 103171307 | A | 6/2013 |
| CN | 105365395 | A | 3/2016 |
| CN | 105984231 | A | 10/2016 |
| CN | 106042648 | A | 10/2016 |
| JP | 60-204386 | A | 10/1985 |
| JP | 7-132613 | A | 5/1995 |
| JP | 10-58791 | A | 3/1998 |
| JP | 11-207989 | A | 8/1999 |
| JP | 2003-231273 | A | 8/2003 |
| JP | 2004-74694 | A | 3/2004 |
| JP | 2004-178182 | A | 6/2004 |
| JP | 2005-193623 | A | 7/2005 |
| JP | 2006-116956 | A | 5/2006 |
| JP | 2012-892 | A | 1/2012 |
| JP | 2012-066563 | A | 4/2012 |
| JP | 2012-201100 | A | 10/2012 |
| JP | 2012-201101 | A | 10/2012 |
| JP | 2013-6320 | A | 1/2013 |
| JP | 2013-152685 | A | 8/2013 |
| JP | 2014-19085 | A | 2/2014 |
| JP | 2014-46612 | A | 3/2014 |
| JP | 2014-046613 | A | 3/2014 |
| JP | 2014-79908 | A | 5/2014 |
| JP | 2014-79933 | A | 5/2014 |
| JP | 2014-159106 | A | 9/2014 |
| JP | 2016-132218 | A | 7/2016 |
| JP | 2016-132220 | A | 7/2016 |
| JP | 2016-132221 | A | 7/2016 |
| JP | 2016-179677 | A | 10/2016 |
| JP | 2016-190361 | A | 11/2016 |
| WO | 2014/034109 | A1 | 3/2014 |

OTHER PUBLICATIONS

Filing Documents of U.S. Appl. No. 16/177,648.
Filing Documents of U.S. Appl. No. 16/677,763.
Filing Documents of U.S. Appl. No. 17/539,545.
Filing Documents of U.S. Appl. No. 18/303,122.
Filing Documents of U.S. Appl. No. 15/947,094.
Filing Documents of U.S. Appl. No. 15/862,035.
Filing Documents of U.S. Appl. No. 16/282,516.
Filing Documents of U.S. Appl. No. 16/839,554.
Filing Documents of U.S. Appl. No. 17/408,638.
Extended European Search Report issued in European Patent Application No. 17187320.1, Jan. 23, 2018.
Notice of Allowance issued in U.S. Appl. No. 15/947,094, Sep. 30, 2019.
Notice of Allowance issued in U.S. Appl. No. 15/947,094, Jan. 29, 2020.
Notice of Allowance issued in U.S. Appl. No. 15/459,181, Oct. 17, 2019.

(56) References Cited

OTHER PUBLICATIONS

Notice of Allowance issued in U.S. Appl. No. 15/459,181, Dec. 26, 2019.
Office Action issued in U.S. Appl. No. 16/839,554, Jun. 12, 2020.
Office Action issued in U.S. Appl. No. 16/282,516, Aug. 8, 2019.
Office Action issued in Chinese Patent Application No. 201680005896.X, Sep. 21, 2018.
Notice of Allowance issued in U.S. Appl. No. 15/862,035, Oct. 11, 2018.
Notice of Allowance issued in U.S. Appl. No. 16/282,516, Dec. 3, 2019.
Office Action issued in U.S. Appl. No. 17/408,638, Feb. 20, 2024.
Office Action issued in U.S. Appl. No. 17/539,545, Oct. 21, 2022.
Office Action issued in Japanese Patent Application No. 2015-009873, Sep. 4, 2018.
Brother Basic User's Guide for printers MFC-J425W, MFC-J430W, and MFC-J435W (Year: 2011).
Office Action issued in U.S. Appl. No. 18/303,122, Apr. 11, 2024.
Related U.S. Appl. No. 15/001,423, filed Jan. 20, 2016.
Related U.S. Appl. No. 15/001,612, filed Jan. 20, 2016.
Related U.S. Appl. No. 15/001,896, filed Jan. 20, 2016.
Related U.S. Appl. No. 15/001,485, filed Jan. 20, 2016.
"Notice of Allowance from U.S. Appl. No. 15/001,485, mailed Jul. 22, 2016".
"Notice of Allowance from U.S. Appl. No. 15/001,896, mailed Aug. 5, 2016".
Office Action (Notice of Allowance) issued in related U.S. Appl. No. 15/001,612, mailed Oct. 17, 2016.
"Office Action issued in related U.S. Appl. No. 15/001,485., mailed Nov. 3, 2016".
Related U.S. Appl. No. 15/455,793, filed Mar. 10, 2017.
Related U.S. Appl. No. 15/441,966, filed Feb. 24, 2017.
Related U.S. Appl. No. 15/459,181, filed Mar. 15, 2017.
U.S. Office Action (Notice of Allowance) issued in related U.S. Appl. No. 15/001,896, mailed Nov. 16, 2016.
U.S. Office Action (Notice of Allowance) issued in related U.S. Appl. No. 15/001,485, mailed Jul. 22, 2016.
U.S. Office Action (Notice of Allowance) issued in related U.S. Appl. No. 15/001,485, Mar. 13, 2017.
"U.S. Office Action issued in related U.S. Appl. No. 15/441,966, mailed Aug. 10, 2017".
Office Action (Notice of Allowance) issued in related U.S. Appl. No. 15/455,793, mailed Sep. 13, 2017.
U.S. Office Action (Notice of Allowance) issued in related U.S. Appl. No. 15/441,966, Nov. 30, 2017.
U.S. Office Action issued in related U.S. Appl. No. 15/637,390, mailed Mar. 9, 2018.
Office Action issued in related U.S. Appl. No. 15/862,035, Jun. 1, 2018.
Office Action (Notice of Allowance) issued in related U.S. Appl. No. 15/637,390, Jul. 11, 2018.
Office Action issued in related U.S. Appl. No. 15/459,181, Sep. 5, 2018.
Office Action (Notice of Allowance) issued in related U.S. Appl. No. 15/947,094, Mar. 18, 2019.
Office Action issued in related U.S. Appl. No. 15/459,181, Jun. 14, 2019.
Office Action issued in related U.S. Appl. No. 16/677,763, Sep. 24, 2020.
Office Action issued in related U.S. Appl. No. 16/677,763, Mar. 10, 2021.
Notice of Allowance issued in related U.S. Appl. No. 17/539,545, Jan. 31, 2023.
Notice of Allowance issued in related U.S. Appl. No. 17/539,545, Nov. 22, 2022.
Brother printer MFC-J430W Basic User's Guide (Year: 2011).
Office Action issued in related U.S. Appl. No. 17/408,638, Aug. 17, 2023.
Office Action issued in related U.S. Appl. No. 18/303,122, Oct. 30, 2023.
Related U.S. Appl. No. 15/874,980, filed Jan. 19, 2018.
Related U.S. Appl. No. 15/875,049, filed Jan. 19, 2018.
Related U.S. Appl. No. 15/875,073, filed Jan. 19, 2018.
Related U.S. Appl. No. 15/875,030, filed Jan. 19, 2018.
Related U.S. Appl. No. 15/874,959 (U.S. Pat. No. 10,933,647) filed Jan. 19, 2018.
Office Action issued in related U.S. Appl. No. 15/875,049, Oct. 4, 2018.
Office Action (Notice of Reasons for Refusal) issued in corresponding Japanese Patent Application No. 2017-008434, Dec. 15, 2020.
InnovationQ Plus—IP.com search, Jan. 2, 2019, pp. 1-2.
Notification of First Office Action issued in related Chinese Patent Application No. 201810052718.3, Apr. 23, 2019.
Office Action issued in related U.S. Appl. No. 15/874,959, Dec. 12, 2019.
Office Action issued in related U.S. Appl. No. 15/874,980, Dec. 23, 2019.
Japanese Office Action (Notice of Reasons for Refusal) issued in related Japanese Patent Application No. 2017-008435, Dec. 1, 2020.
Notice of Allowance issued in related U.S. Appl. No. 18/303,122, Oct. 28, 2024.
Notice of Allowance issued in related U.S. Appl. No. 18/303,122, Jul. 29, 2024.

INKJET RECORDING APPARATUS WITH COVER AND METHOD THEREFOR INCLUDING INQUIRY AND NOTIFICATION FEATURES

CROSS REFERENCE TO RELATED APPLICATION

This application is a continuation of U.S. patent application Ser. No. 17/464,775, filed Sep. 2, 2021, now U.S. Pat. No. 11,919,314, which is a continuation of U.S. patent application Ser. No. 16/424,575, filed May 29, 2019, now U.S. Pat. No. 11,110,712, which is a continuation of U.S. patent application Ser. No. 15/405,415, filed Jan. 13, 2017, now U.S. Pat. No. 10,328,705, which is a continuation of U.S. patent application Ser. No. 15/001,375, filed Jan. 20, 2016, now U.S. Pat. No. 9,550,365, and further claims priority from Japanese Patent Application No. 2015-009873 filed Jan. 21, 2015. The entire contents of all applications is incorporated herein by reference.

TECHNICAL FIELD

The present disclosure relates generally to an inkjet recording apparatus with a cover and a method for thereof including inquiry and notification features.

BACKGROUND

A conventional inkjet recording apparatus known in the prior art has ink chambers in which inks can be refilled through supply holes, instead of using replaceable ink cartridges.

SUMMARY

In accordance with the present disclosure, an inkjet recording apparatus includes a cover and a cover sensor. The cover is movable to cover a plurality of injection inlets associated with a plurality of ink chambers and to expose the plurality of injection inlets. The cover sensor outputs signal depending on position of the cover. The ink jet recording apparatus can display notification on a monitor based on the signal from the cover sensor. The inkjet recording apparatus can display one of inquiry information and notification on the monitor depending on receipt of the signal from the cover sensor

BRIEF DESCRIPTION OF THE DRAWINGS

The particular features and advantages of the disclosure will become apparent from the following description taken in connection with the accompanying drawings, in which:

FIG. 1A illustrates a state in which a cover is closed and FIG. 1B illustrates a state in which the cover is open;

DETAILED DESCRIPTION

Figure 1A:
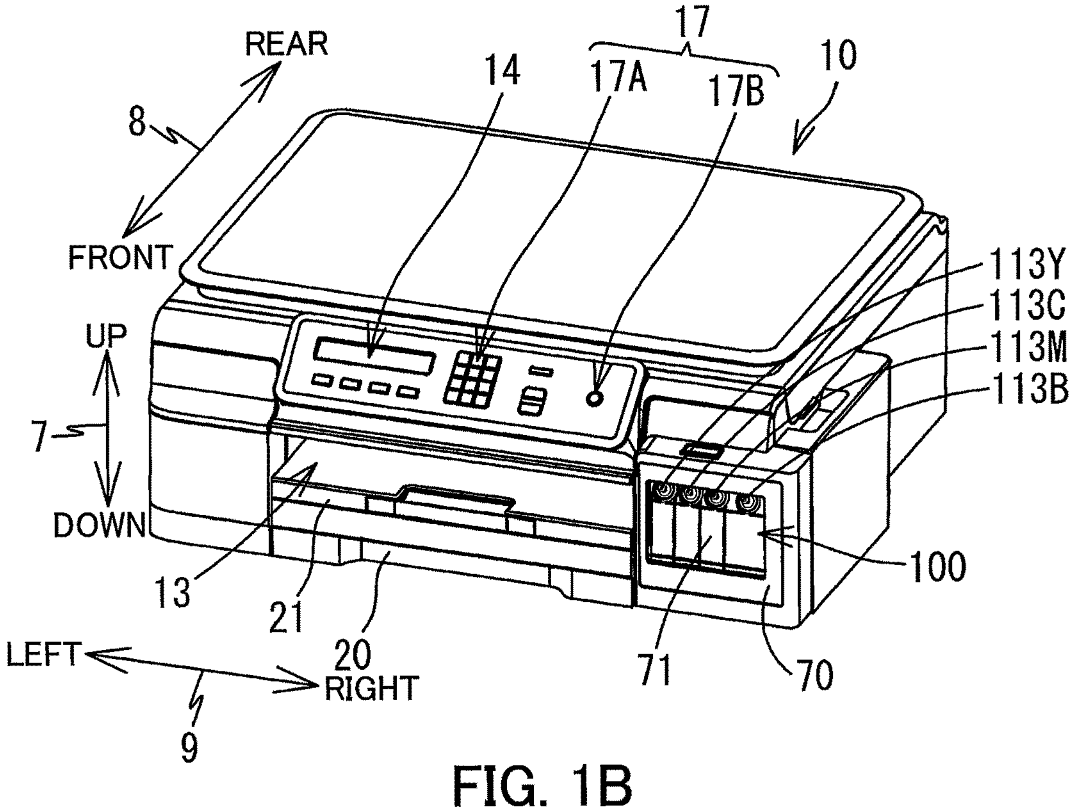
FIGS. 1A and 1B are each a perspective view illustrating the outside shape of a MFP.

An inkjet recording apparatus according to an embodiment will be described while referring to the accompanying drawings wherein like parts and components are designated by the same reference numerals to avoid duplicating description. The embodiment described below is only an example of the present invention; it will be appreciated that the embodiment can be appropriately changed without departing from the intended scope of the present invention.

In this description, an up-and-down direction 7 is defined with respect to a state in which a MFP 10 is installed so as to be ready for being used, a fore-and-aft direction 8 is defined by taking a side on which an opening 13 is formed in the MFP 10 as a near side (front surface side), and a right-and-left direction 9 is defined when the MFP 10 is viewed from the near side (front surface side).

<Whole Structure of the Multi-Function Peripheral 10>

Figure 1B:
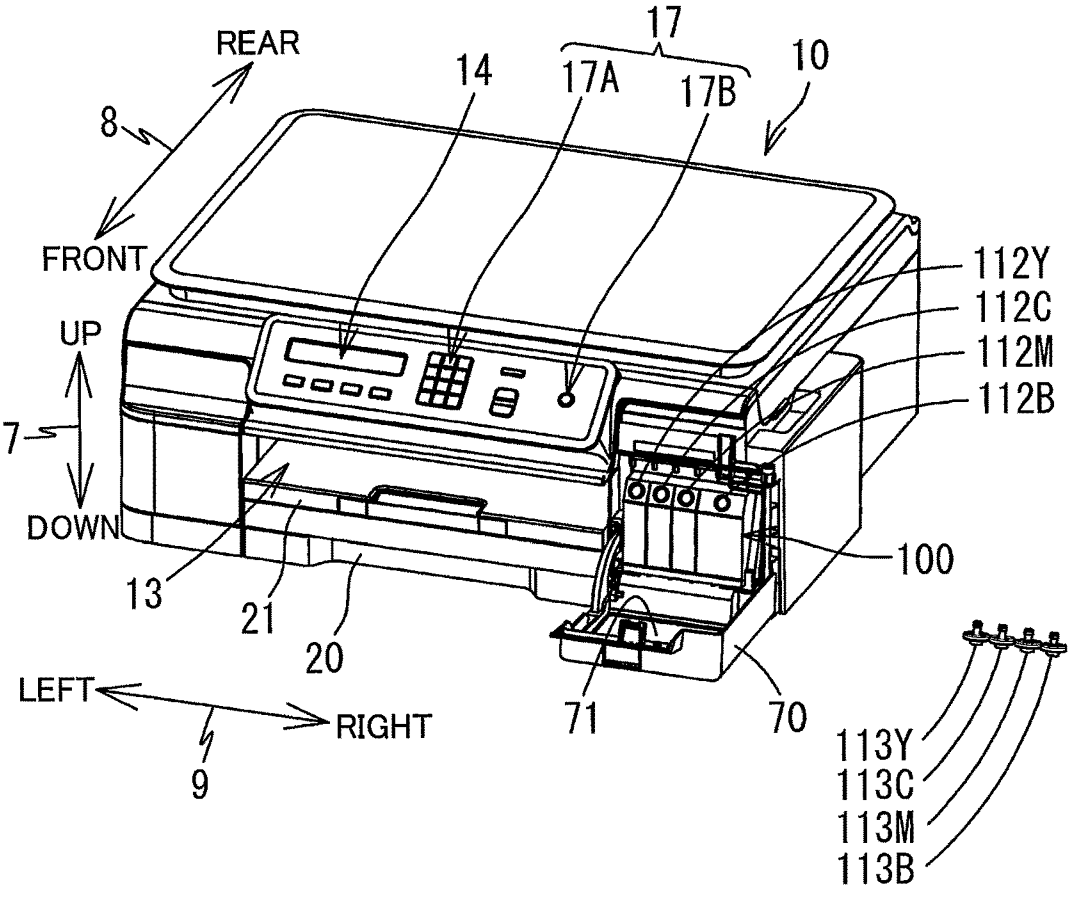

The multi-function peripheral 10 is a substantially rectangular parallelepiped body as illustrated in FIGS. 1A and 1B. The MFP 10 has print functions that print an image on a sheet in an inkjet printing method. As illustrated in FIGS. 1A, 1B, 2, and 7, the MFP 10 includes a feed tray 20, a discharge tray 21, a conveyor 23, a recording unit 24, and an ink tank 100. The MFP 10 is an example of an inkjet recording apparatus.

<Feed Tray 20 and Discharge Tray 21>

The user may insert the feed tray 20 into the MFP 10, or remove from the feed tray 20 as well. The user may remove feed tray 20 from the MFP 10 in the fore-and-aft direction 8 through the opening 13. The opening 13 is formed in the front surface of the MFP 10 at the center in the right-and-left direction 9, as illustrated in FIGS. 1A and 1B. The feed tray 20 is able to support a stack of a plurality of sheets. The discharge tray 21 is disposed above the feed tray 20. And the discharge tray 21 is able to support sheets discharged by the conveyor 23.

<Conveyor 23 and Recording Unit 24>

The conveyor 23 conveys a sheet supported on the feed tray 20 through a position at which the sheet faces the recording unit 24 to the discharge tray 21. The conveyor 23 has, for example, a roller that rotates while abutting a sheet. The recording unit 24 ejects ink retained in the ink tank 100 to record an image on the sheet conveyed by the conveyor 23. The recording unit 24 has, for example, a carriage that is movable in a direction crossing a direction in which the sheet is conveyed and also includes a recording head for ejecting ink, the recording head being mounted on the carriage.

Figure 2:
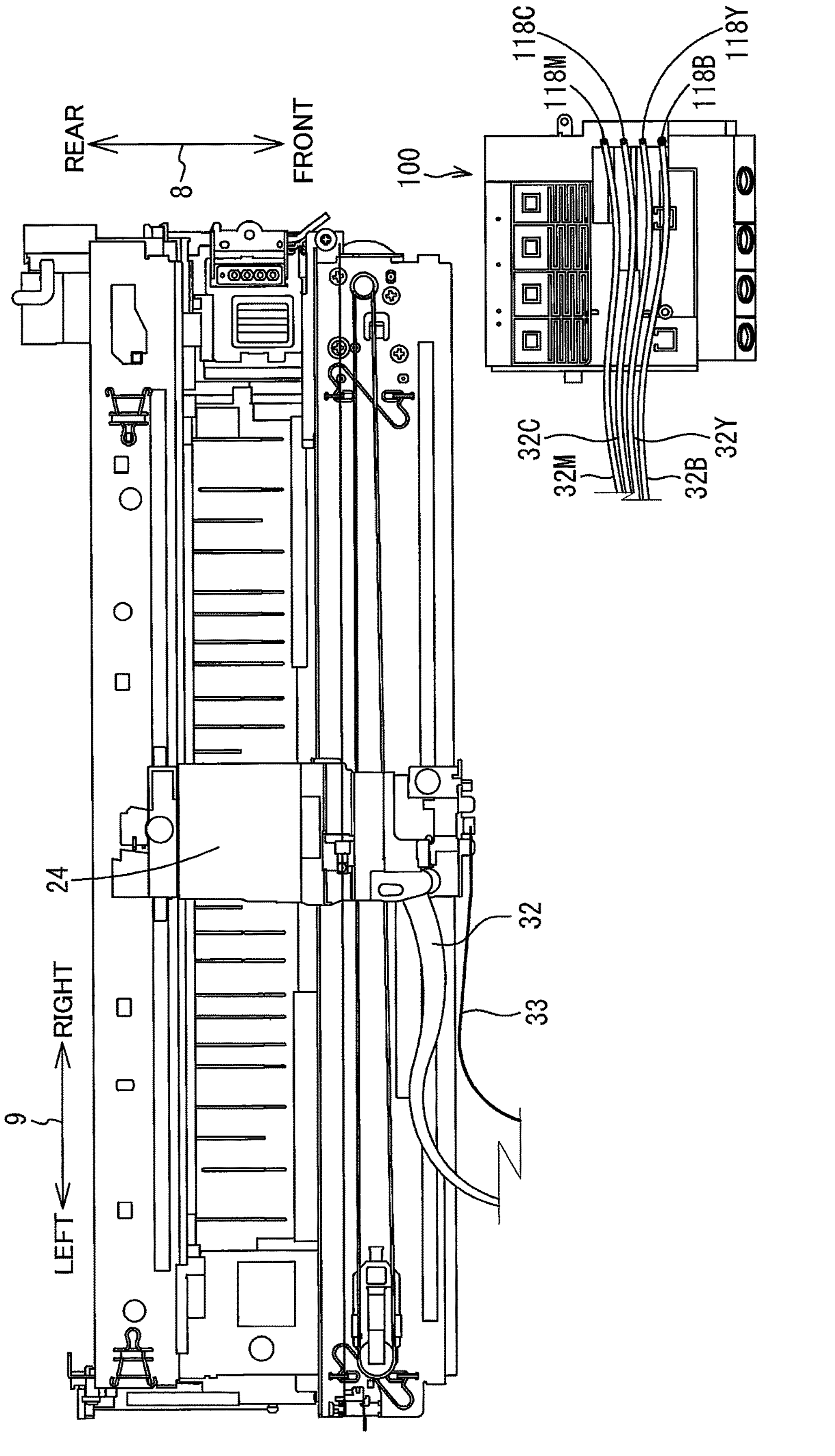
FIG. 2 is a plan view illustrating a recording unit and an ink tank.

Ink tubes 32 and a flexible flat cable 33 are connected to the recording unit 24, as illustrated in FIG. 2. Ink retained in the ink tank 100 is supplied to the recording unit 24 through the ink tubes 32. Specifically, four ink tubes 32B, 32M, 32C, and 32Y (sometimes collectively referred to below as the ink tubes 32), through which inks in black, magenta, cyan, and yellow are respectively supplied, extend from the ink tank 100 and are connected to the recording unit 24 in a state in which the ink tubes 32 are bound together. Control signals output from a controller 130 (see FIG. 7) are transmitted to the recording unit 24 through the flexible flat cable 33.

<Ink Tank 100>

The ink tank 100 is located in the MFP 10 as illustrated in FIGS. 1A and 1B. The ink tank 100 is fixed to the MFP 10 so that the ink tank 100 cannot be easily removed from the MFP 10. The ink tank 100 has a front wall 101, a right wall 102, a left wall 103, an upper wall 104, and a lower wall 105. The rear of the ink tank 100, which is open, is sealed with a film 106.

The front wall 101 defines the front ends of ink chambers 111 in the fore-and-aft direction 8. The front wall 101 is formed with a base wall 101A, which extends from the lower wall 105 substantially in the up-and-down direction 7 and an inclined wall 101B, which extends from the upper edge of the base wall 101A and is inclined backward with respect to the base wall 101A. The front wall 101 is translucent to a degree in which ink in the ink chambers 111 are visible to the user from the outside of the ink tank 100. Although, in the above description, only the front wall 101 is translucent, this is not a limitation; all walls 101 to 105 may be translucent.

Figure 5:
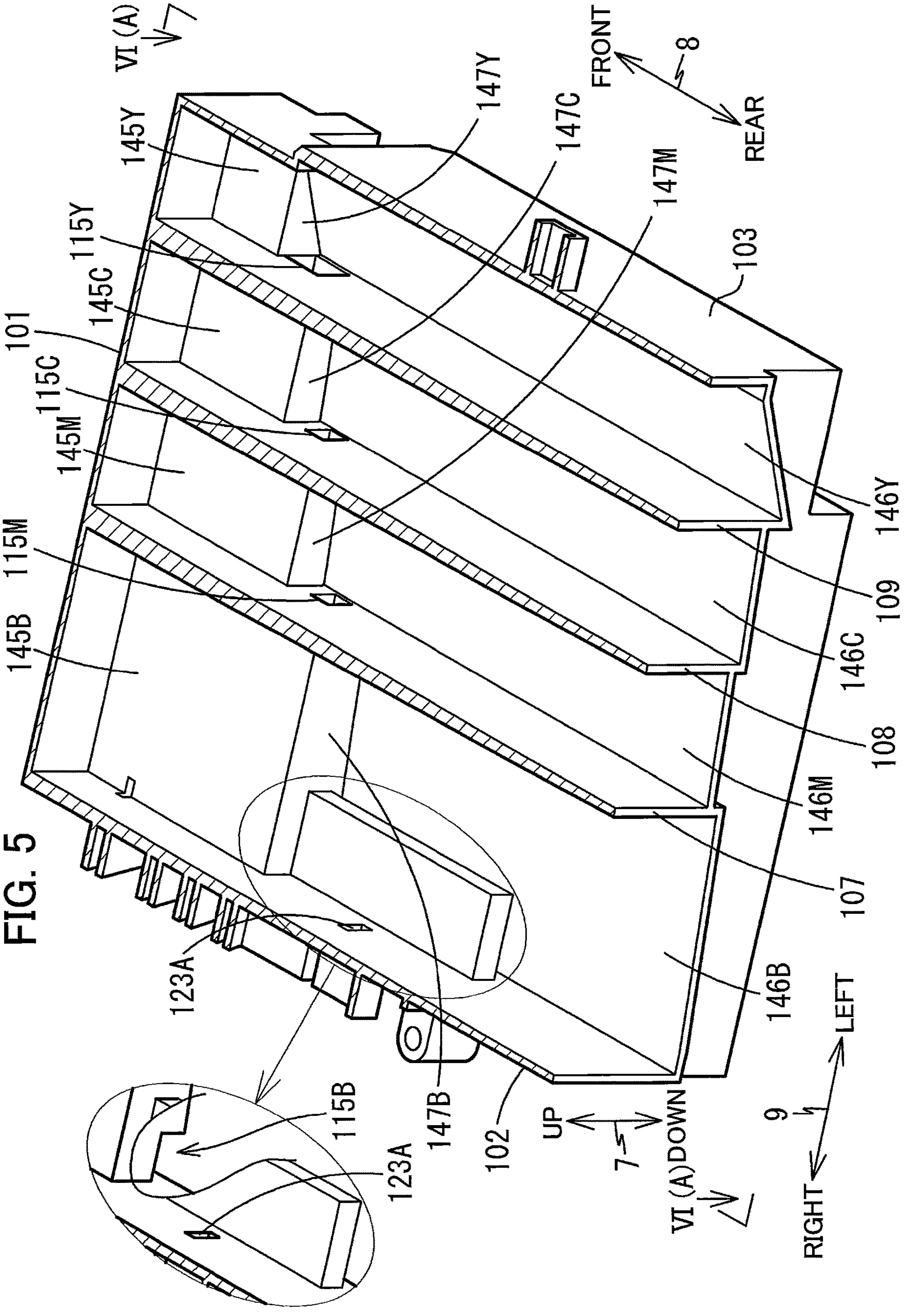
FIG. 5 is a perspective cross-sectional view taken along line V-V in FIG. 3.
Figure 6A:
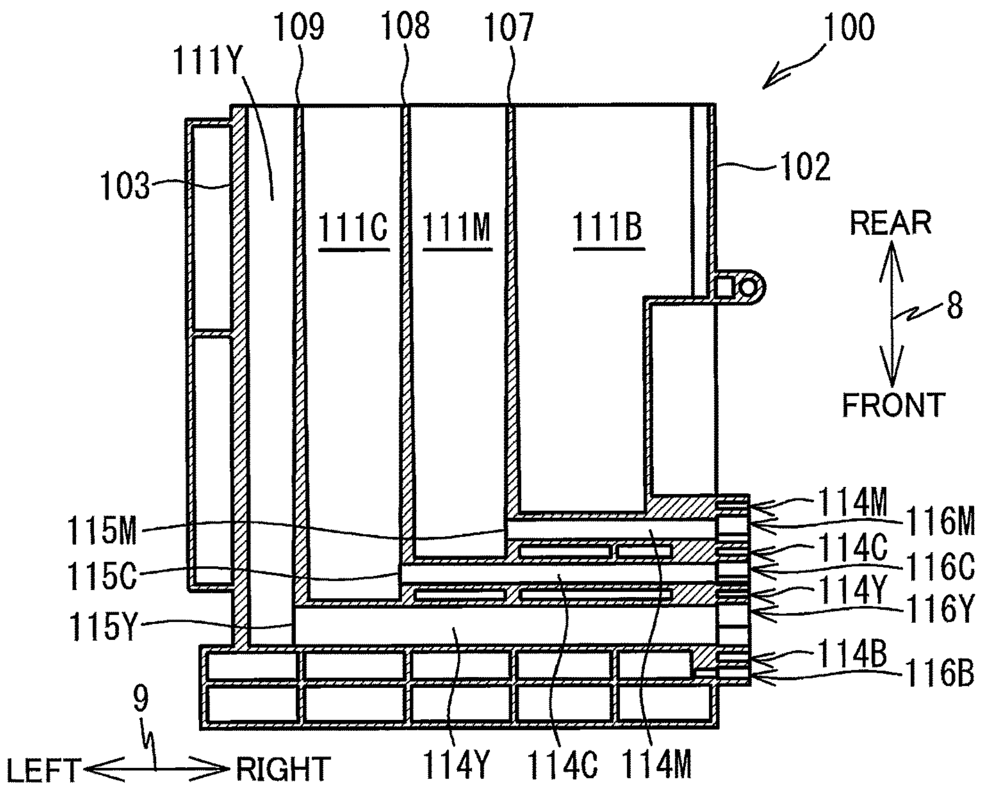
FIG. 6A is a cross-sectional view taken along line VI(A)-VI(A) in FIG. 5.
Figure 6B:
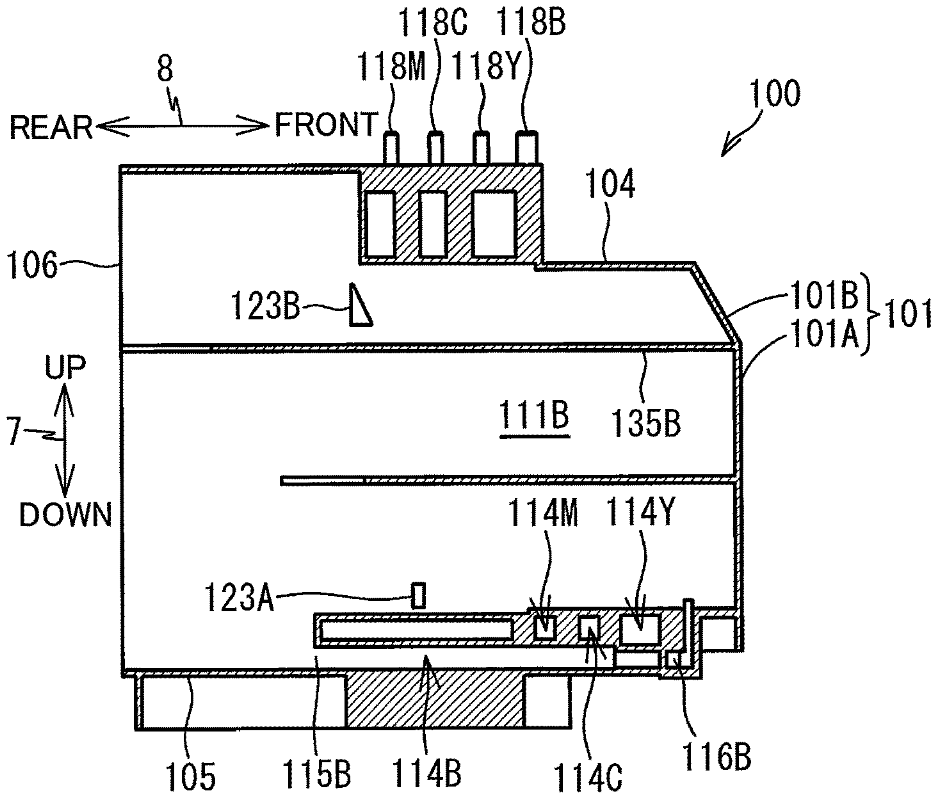
FIG. 6B is a cross-sectional view taken along line VI(B)-VI(B) in FIG. 3.

The lower wall 105 defines the lower ends of the ink chambers 111 in the up-and-down direction 7. As illustrated in FIG. 5, the lower wall 105 has upper-stage walls 145, lower-stage walls 146, and connecting walls 147. The upper-stage walls 145 are in contact with the inner surface of the front wall 101 (specifically, the base wall 101A). The lower-stage walls 146 are in contact with the film 106. The lower-stage walls 146 are positioned below the upper-stage walls 145 and behind the upper-stage walls 145. The upper edge of each connecting wall 147 is connected to the rear edge of the corresponding upper-stage wall 145, and the lower edge of the connecting wall 147 is connected to the front edge of the corresponding lower-stage wall 146.

<Ink Chambers 111>

Figure 4:
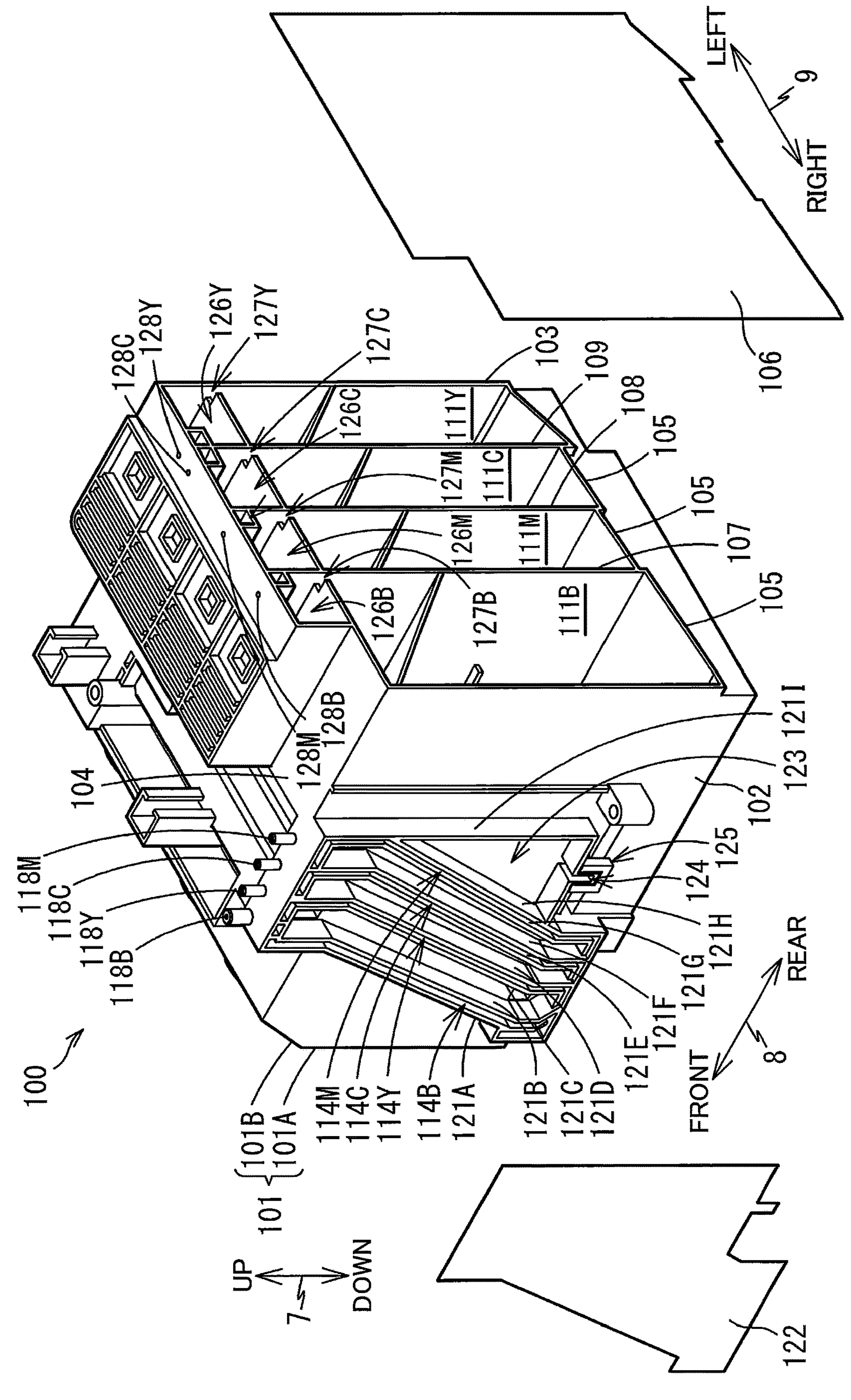
FIG. 4 is a backward perspective view of the ink tank.

The ink tank 100 has a plurality of partition walls 107, 108, and 109 that partition the internal space of the ink tank 100, as illustrated in FIG. 4. The partition walls 107 to 109 extend in the up-and-down direction 7 and fore-and-aft direction 8 and are in contact with the front wall 101, upper wall 104, lower wall 105, and film 106. The partition walls 107 to 109 are spaced in the right-and-left direction 9, partitioning the internal space of the ink tank 100 into four ink chambers 111B, 111M, 111C, and 111Y in which ink is retained.

Inks in different colors are retained in the ink chambers 111B, 111M, 111C, and 111Y. Specifically, ink in black is retained in the ink chamber 111B, ink in cyan is retained in the ink chamber 111C, ink in magenta is retained in the ink chamber 111M, and ink in yellow is retained in the ink chamber 111Y. Cyan, magenta, and yellow are examples of a first color, and black is an example of a second color. The ink chambers 111M, 111C, and 111Y are examples of a first ink chamber, and the ink chamber 111B is an example of a second ink chamber. An ink bottle which is filled with a predetermined amount of ink is provided as ink to be supplied into the corresponding ink chamber 111.

However, the form of the ink tank 100 is not limited to the example described above. For example, the MFP 10 may have four ink tanks each of which has an ink chamber in which ink in a different color is retained. The number of ink chambers 111 and the colors of inks in them are not limited to the example described above. For example, only the ink chamber 111B, in which ink in black is retained, may be provided. The ink chambers 111B, 111M, 111C, and 111Y may be collectively referred to below as the ink chambers 111. Each four constituent elements corresponding to the ink chambers 111 (such as injection inlets 112B, 112M, 112C, and 112Y and ink flow paths 114B, 114M, 114C, and 114Y, which will be described later) are assigned reference characters that differ only in suffixes (B, M, C, and Y). When these four elements are collectively referenced, they may be denoted by the same reference numeral without these suffixes (as in the form of injection inlets 112 and ink flow paths 114, which will be described later).

Now, the amount of ink in an ink bottle will be denoted $V_{max}$, and the volume of a space enclosed by the lower-stage wall 146 and connecting wall 147 and located behind and below the upper-stage wall 145 (the space will be referred to below as the spare retaining chamber) will be denoted $V_0$. Then, a remaining amount threshold is represented as $(V_0-\alpha)$, a first discharge threshold is represented as $[V_{max}-(V_0-\alpha)]$, and a second discharge threshold is represented as $(V_{max}-V_0)$. Although there is no particular limitation on the specific value of a, its value may be determined, for example, as described below.

The value of α corresponds to, for example, the volume of the spare retaining chamber between the upper surface of the upper-stage wall 145 and the upper edge of an opening 115. Specifically, a may be set to a value that is equal to the volume of the spare retaining chamber or is slightly smaller than the volume. Thus, in image recording processing described later, it is possible to suppress the liquid level of ink in the ink chamber 111 from falling below the upper edge of the opening 115, which would otherwise cause air to enter the ink flow path 114, the ink tube 32, and the recoding head of the recording unit 24. The value of α is larger than 0 and is smaller than $(V_{max}-V_0)$ and $V_0$.

The remaining amount threshold is a value determined for the amount of ink in the ink chamber 111. Depending on whether the amount of ink is larger than or equal to or smaller than remaining amount threshold, a different remaining amount signal is output from an ink sensor 125 described later. The first discharge threshold corresponds to the amount of ink consumed from when ink for one ink bottle is injected into the ink chamber 111, which is empty, until the amount of ink in the ink chamber 111 falls to the remaining amount threshold. The second discharge threshold corresponds to the amount of ink consumed from when ink for one ink bottle is injected into the empty ink chamber 111 until the liquid level in the ink chamber 111 matches the height of the upper-stage wall 145. The first discharge threshold and second discharge threshold (they may be collectively referred to below as discharge thresholds) are values that are compared with a counted value described later. The remaining amount threshold, first discharge threshold, and second discharge threshold may differ for each ink chamber 111.

<Injection Inlets 112>

Injection inlets 112B, 112M, 112C, and 112Y, from which ink is injected into their corresponding ink chambers 111, are formed in the inclined wall 101B of the ink tank 100. Each injection inlet 112 passes through the inclined wall 101B in its thickness direction so that the corresponding ink chamber 111 communicates with the outside of the ink tank 100. The inner surface of the inclined wall 101B faces the interior of each ink chamber 111, and the outer surface of the inclined wall 101B faces the outside of the ink tank 100. The injection inlets 112 may be formed in the upper wall 104 instead of the inclined wall 101B.

The ink tank 100 has caps 113B, 113M, 113C, and 113Y, which can be attached to their corresponding injection inlets 112 and can be removed from them. As illustrated in FIG.

1A, the cap 113 attached to the injection inlet 112 is in tight contact with the circumferential edge of the injection inlet 112, blocking the injection inlet 112. When the cap 113 is removed from the injection inlet 112, the injection inlet 112 is opened as illustrated in FIG. 1B. The cap 113 is attached to the injection inlet 112 and is removed from it in a state in which a cover 70 described later, is located at an exposed position. When the user removes the cap 113 from the injection inlet 112, the user can inject ink from the corresponding ink bottle into the ink chambers 111.

<Ink Flow Paths 114>

Ink flow paths 114B, 114M, 114C, and 114Y are formed in the ink tank 100 as illustrated in FIGS. 4, 5, 6A, and 6B. The ink flow paths 114M, 114C, and 114Y respectively communicate with the ink chambers 111M, 111C, and 111Y through openings 115M, 115C, and 115Y. The openings 115M, 115C, and 115Y are respectively formed in the vicinity of the lower edges of the partition walls 107, 108, and 109. The flow path 114B communicates with the ink chamber 111B through an opening 115B. The opening 115B is formed in the vicinity of a boundary between the right wall 102 and the lower wall 105. The ink flow paths 114B, 114M, 114C, 114Y respectively extend from their corresponding openings 115 through openings 116B, 116M, 116C, and 116Y. The openings 116B, 116M, 116C, and 116Y are formed in the right wall 102 to the right side surface of the ink tank 100.

Each ink flow path 114 further extends upwardly from the opening 116 along the outer surface of the right wall 102 and is connected to a linking portion 118. Four linking portions 118 are formed so as to protrude toward the upper wall 104 of the ink tank 100. The four ink tubes 32B, 32M, 32C, and 32Y corresponding to inks in the four colors are connected to these linking portions 118 (see FIG. 2). That is, each ink flow path 114 is a flow path that leads ink flowed out from its corresponding ink chamber 111 through the ink tube 32 liked to its corresponding linking portion 118 to the recording unit 24.

A plurality of protruding walls 121A to 121I are formed on the right wall 102 of the ink tank 100 as illustrated in FIG. 4. Each protruding wall 121 protrudes from the outer surface (right side surface) of the right wall 102 to the right and extends along the outer surface of the right wall 102. A film 122 is attached to the right ends of the protruding walls 121A to 121I by being melted. Each ink flow path 114 between its corresponding opening 116 and linking portion 118 is a space defined by the film 122 and adjacent two of the protruding walls 121A to 121H.

<Additional Ink Chamber 123>

An additional ink chamber 123 is further formed in the right side surface of the ink tank 100. The additional ink chamber 123 is defined by the right wall 102, the protruding walls 121H and 121I, which are contiguous in the circumferential direction, and the film 122. The additional ink chamber 123 communicates with the ink chamber 111B through through-holes 123A and 123B. Through-holes 123A and 123B pass through the right wall 102. In the additional ink chamber 123, a to-be-detected portion 124 is formed by enclosing the front, rear, and bottom of the through-hole 123A with part of the protruding wall 121I, which defines the lower edge of the additional ink chamber 123.

The lower edge of the through-hole 123A (that is, the lower edge of the to-be-detected portion 124) is located below the upper surface of the upper-stage wall 145B. Therefore, if the amount of ink in the ink chamber 111B is equal to or larger than the remaining amount threshold, ink enters the to-be-detected portion 124 through the through-hole 123A. If the amount of ink in the ink chamber 111B is smaller than the remaining amount threshold, ink in the to-be-detected portion 124 is discharged through the through-hole 123A to the ink chamber 111B, so ink is no longer present in the to-be-detected portion 124.

<Ink Sensor 125>

Figure 3:
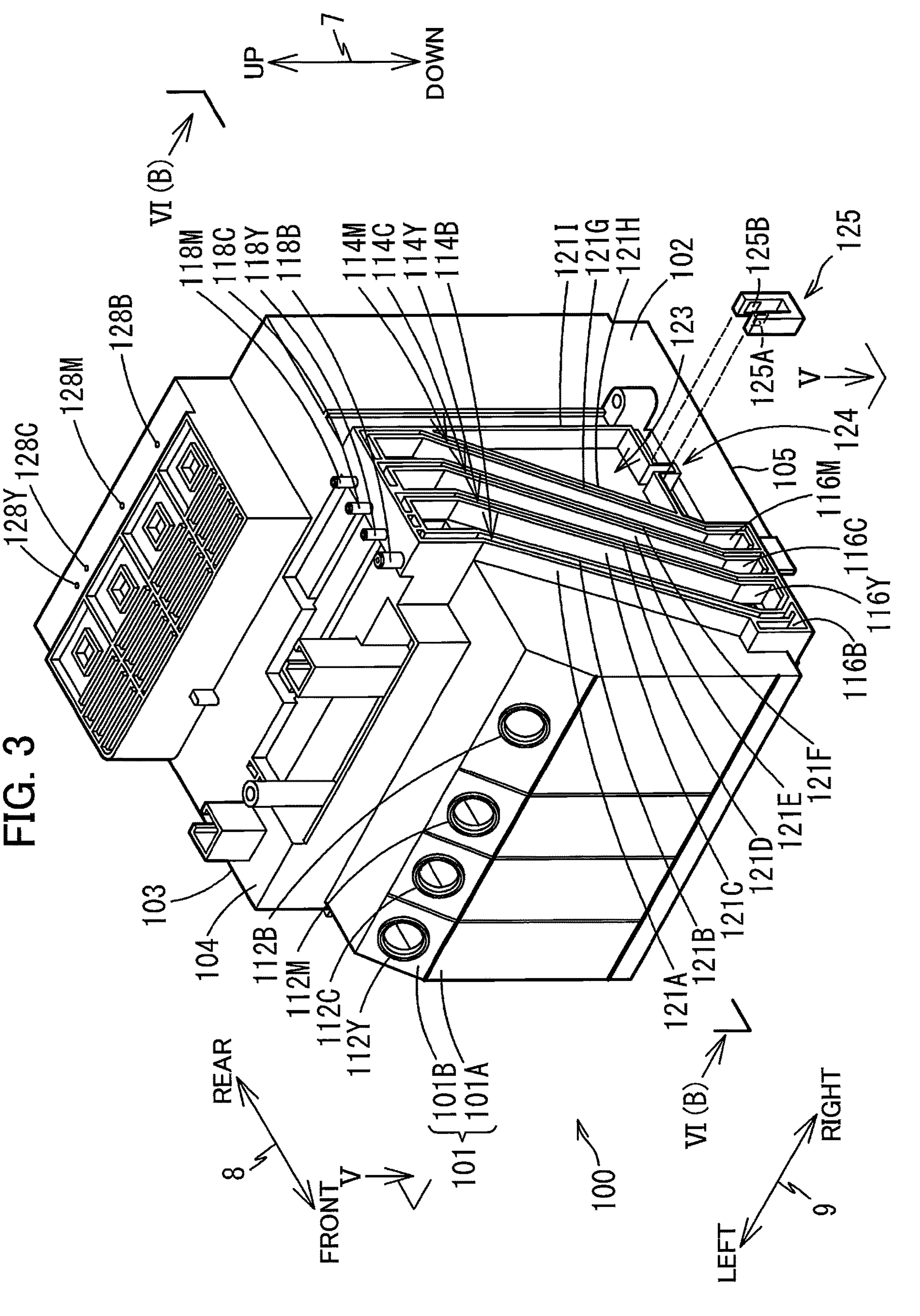
FIG. 3 is a forward perspective view of the ink tank.

The MFP 10 has an ink sensor 125 as illustrated in FIGS. 3 and 4. The ink sensor 125 has a light emitter 125A and a light receiver 125B. The light emitter 125A and the light receiver 125B are disposed so as to face each other in the fore-and-aft direction 8 with the to-be-detected portion 124 intervening between them. The light emitter 125A emits light toward the light receiver 125B. The light is, for example, visible light or infrared light so that the light transmits through the protruding wall 121I but does not transmit through black ink. The light receiver 125B outputs a different remaining amount signal to the controller 130, depending on whether the light receiver 125B has received light emitted from the light emitter 125A. In other words, the ink sensor 125 outputs a different remaining amount signal to the controller 130, depending on the amount of ink retained in the ink chamber 111B.

Based on the detection that ink is present in the to-be-detected portion 124 (in other words, the amount of ink in the ink chamber 111B is equal to or larger than the remaining amount threshold), the ink sensor 125 outputs a first signal. Based on the detection that ink is not present in the to-be-detected portion 124 (in other words, the amount of ink in the ink chamber 111B is smaller than the remaining amount threshold), the ink sensor 125 outputs a second signal. The signal level of the first signal of the ink sensor 125 is 0 V and the signal level of the second signal of the ink sensor 125 is 3.3 V. That is, when the ink sensor 125 outputs a signal, a case in which the signal level is 0 V is also included. However, a combination of the signal levels is not limited to the example described above. This is also true for positional signals output from a cover sensor 72 described later.

That is, if black ink from single ink bottle is injected into the empty ink chamber 111B and ink is then consumed by an amount corresponding to the second discharge threshold, the liquid level of ink remaining in the ink chamber 111B substantially matches the height of the upper surface of the upper-stage wall 145B. At that time, the first signal output from the ink sensor 125 is present. If the amount of ink consumed reaches the first discharge threshold, the liquid level of ink remaining in the ink chamber 111B is below the upper-stage wall 145B. At that time, the second signal output from the ink sensor 125 is present.

<Air Communicating Paths 126>

The ink tank 100 forms air communicating paths 126B, 126M, 126C, and 126Y as illustrated in FIG. 4. Through each air communicating path 126, its corresponding ink chamber 111 communicates with the air. Specifically, the air communicating path 126 communicates with its corresponding ink chamber 111 through a cutout 127 formed at the upper edge of the ink chamber 111 and also communicates with the outside of the ink tank 100 through an opening 128.

<Cover 70>

The MFP 10 has a cover 70 as illustrated in FIGS. 1A and 1B. The cover 70 is rotatably supported by the MFP 10 (rotation is an example of movement). The cover 70 can be rotated to a covered position illustrated in FIG. 1A and to the exposed position illustrated in FIG. 1B.

At the covered position, the cover 70 covers part of all injection inlets 112, restricting ink from being injected into any of all the ink chambers 111. When the cover 70 is positioned at the covered position, part of each injection inlet 112 (in other words, part of each cap 113) is covered. Then, if the user attempts to remove the cap 113, the attempt fails because the cover 70 covers part of the corresponding cap 113. That is, the cover 70 at the covered position restricts each cap 113 from being removed, restricting each injection inlet 112 from being opened. Therefore, the cover 70 at the covered position restricts ink from being injected to any of all the ink chambers 111. However, whole of each injection inlet 112 is covered by the cover 70. Specifically, the cover 70 only needs to be structured so that the cover 70 at the covered position restricts ink from being injected into each ink chamber 111. At the exposed position, the cover 70 is open and all injection inlets 112 are exposed to the outside of the MFP 10, allowing ink to be injected into all ink chambers 111.

A series of user's operations to inject ink is, for example, as described below. First, the user moves the cover 70 at the covered position to the exposed position and removes the cap 113 from the injection inlet 112 corresponding to the color of ink that the user is injecting. The user then inserts the top of an ink bottle into the injection inlet 112, which has been opened, and completely injects the ink in the ink bottle into the ink chamber 111. Upon completion of the injection of the ink, the user attaches the cap 113, which has been removed, to its corresponding injection inlet 112 and moves the cover 70 to the covered position.

The cover 70 has a transparent window 71, which faces the front wall 101 of the ink tank 100 with the cover 70 positioned at the covered position. Therefore, the user can visually check the amount of ink remaining in each ink chamber 111 through the front wall 101, regardless of whether the cover 70 is at the covered position or exposed position. The transparent window 71 is formed so that a height to the lower edge of the transparent window 71 in the cover 70 (position of the lower edge of the transparent window 71 in the up-and-down direction 7) substantially matches the height of each upper-stage wall 145. Therefore, if ink is retained only in a spare retaining chamber, it is difficult for the user to view the ink, so the user can determine at a glance that ink is not retained in the ink chamber 111.

<Cover Sensor 72>

Figure 7:
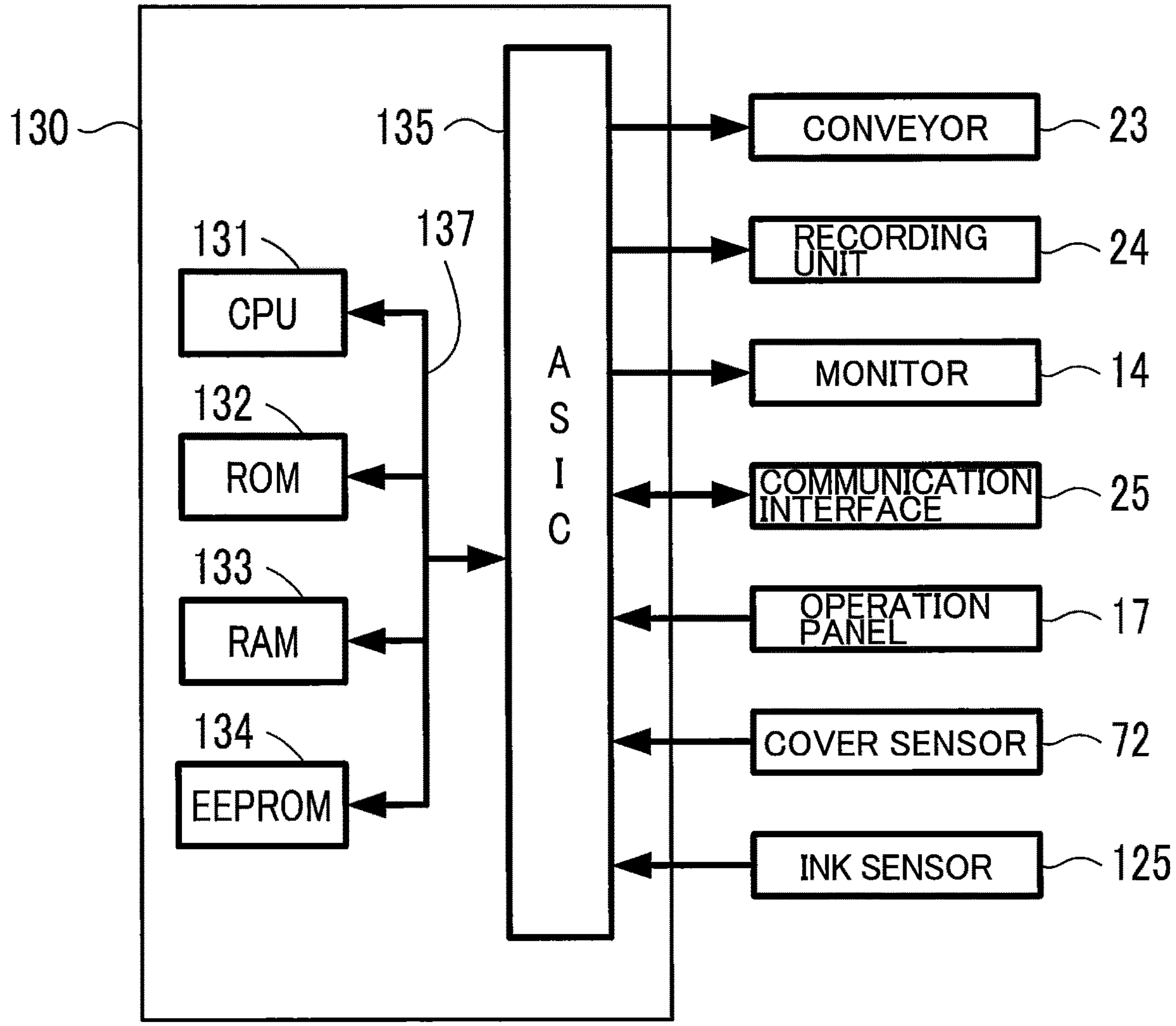
FIG. 7 is a block diagram of the MFP.

The MFP 10 further has a cover sensor 72 (see FIG. 7). The cover sensor 72 may be, for example, a switch that the cover 70 opens and closes by making or breaking a contact or another mechanical switch. Alternatively, the cover sensor 72 may be an optical sensor that allows or blocks transmission of light, depending on the position of the cover 70 or the movement. The cover sensor 72 outputs a different positional signal to the controller 130, depending on the position of the cover 70. The cover sensor 72 outputs, to the controller 130, a first positional signal when the cover 70 is positioned at the covered position and a second positional signal when the cover 70 is positioned at the exposed position. The signal level of the first positional signal of the cover sensor 72 is 0 V and the signal level of the second positional signal of the cover sensor 72 is 3.3 V.

<Monitor 14>

The MFP 10 includes a monitor 14 as illustrated in FIGS. 1A and 1B. The monitor 14 displays information of which the user should be notified as a message. There is no particular limitation on the specific structure of the monitor 14. For example, a liquid crystal display, an organic electroluminescence (EL) display, or the like can be used.

The monitor 14 is rectangular with eight dots vertically and 80 dots horizontally. That is, the monitor 14 can display up to 16 characters (including spaces) each of which has a size of eight dots vertically by five dots horizontally (about 8 mm vertically by about 5 mm horizontally). If a character string to be displayed on the monitor 14 includes more than 16 characters, the character string is displayed by being scrolled. When character strings in a plurality of rows are displayed on the monitor 14, a character string in one row is displayed in turn.

<Operation Panel 17>

The MFP 10 includes an operation panel 17 as illustrated in FIGS. 1A and 1B. The operation panel 17 is an input interface that accepts a command for the MFP 10 from the user. The operation panel 17 has a plurality of pushbuttons including, for example, a numeric keypad 17A and a power button 17B. However, the specific structure of the operation panel 17 is not limited to pushbuttons. The operation panel 17 may be a touch sensor superimposed on a screen displayed on the monitor 14.

The operation panel 17 outputs, to the controller 130, an operation signal in response to a pushbutton that has been pushed. The operation panel 17 outputs, to the controller 130, a first operation signal, a second operation signal, and the third operation signal. The operation panel 17 outputs the first operation signal in response to the pressing of a button labeled 1, which is included in the numeric keypad 17A. The operation panel 17 outputs the second operation signal in response to the pressing of a button labeled 2, which is included in the numeric keypad 17A. The operation panel 17 outputs the third operation signal in response to the pressing of the power button 17B. The buttons corresponding to the first operation signal, second operation signal, and third operation signal are not limited to the above examples.

<Communication Interface 25>

The MFP 10 includes a communication interface 25 as illustrated in FIG. 7. The communication interface 25 is an interface through which the MFP 10 communicates with an external apparatus. Specifically, the MFP 10 outputs various types of data to the external apparatus through the communication interface 25, and receives various types of data from the external apparatus through the communication interface 25. The communication interface 25 may function as a facsimile receiver that receives facsimile data from the external apparatus.

<Controller 130>

The controller 130 includes a central processing unit (CPU) 131, a read-only memory (ROM) 132, a random-access memory (RAM) 133, an electrically erasable programmable ROM (EEPROM) 134, and an application-specific integrated circuit (ASIC) 135, as illustrated in FIG. 7, which are mutually connected through an internal bus 137. Programs performed by the CPU 131 to control various operations and other items are stored in the ROM 132. The RAM 133 is used as a storage area in which data, signals, and the like that are used by the CPU 131 to perform the above programs are temporarily stored or as a working area used in data processing. Settings, flags, and the like that need to be retained even after power is turned off are stored in the EEPROM 134.

The EEPROM 134 includes, for example, an initial flag are. The initial flag are stored either values corresponding to whether the MFP 10 has performed initial processing. Specifically, a first value is stored, in the initial flag area, when initial processing has not yet been performed or a second value is stored, in the initial flag area, when initial processing has been already performed. In initial processing, a flow path from the ink chamber 111 to the recording head of the recording unit 24 (that is, the ink flow path 114 and ink tube 32) is filled with ink.

The flow path from the ink chamber 111 to the recording head of the recording unit 24 is not filled with ink before the MFP 10 is shipped. That is, the first value is stored in the initial flag area when the MFP 10 is shipped. When the controller 130 performs initial processing, the ink flow path 114, the ink tube 32, and the recording head of the recording unit 24 are filled with ink, making the MFP 10 ready for recording an image on a sheet. That is, after initial processing has been performed, the second value is stored in the initial flag area. Instead of ink, the flow path may be filled with a shipping liquid, which is used only during transportation and is not used to record an image on a sheet before the MFP 10 is shipped. In this case, when the controller 130 performs initial processing, the shipping liquid in the flow path is discharged and the flow path is then filled with ink.

The EEPROM 134 stores a counted value that indicates the amount of ink discharged from the recording head of the recording unit 24 for each ink color. The counted value stored in the EEPROM 134 is initialized (that is, set to 0) in steps S26 and S49 described later, and is incremented in step S69 described later. The counted value is compared with the first discharge threshold and second discharge threshold. The method of updating the counted value is not limited to the above example. For example, a counted value corresponding to the maximum amount $V_m$ax of ink retainable in the ink chamber 111 may be set in steps S26 and S49 and may be decremented in step S69. The counted value to be decremented is compared with its corresponding remaining amount threshold.

The conveyor 23, recording unit 24 including the recording head, monitor 14, communication interface 25, operation panel 17, cover sensor 72, and ink sensor 125 are connected to the ASIC 135. The controller 130 controls the conveyor 23 to convey a sheet, controls the recording head of the recording unit 24 to eject ink, controls the monitor 14 to display information on the monitor 14, and controls the communication interface 25 to communicate with an external apparatus. The controller 130 receives operation signals from the operation panel 17, positional signals from the cover sensor 72, and signals from the ink sensor 125. The controller 130 reads, for example, positional signals output from the cover sensor 72 and signals output from the ink sensor 125 at predetermined intervals (for example, 50-ms intervals).

<Operations of the MFP 10>

Operations of the MFP 10 will be described with reference to FIGS. 8 to 13. Processing illustrated in FIGS. 8 to 13 is performed by the CPU 131 in the controller 130. To implement processing described below, the CPU 131 may read programs stored in the ROM 132 and may perform them. Alternatively, the processing may be implemented by a hardware circuit mounted in the controller 130.

<Processing when the Cover is Open>

Figure 8:
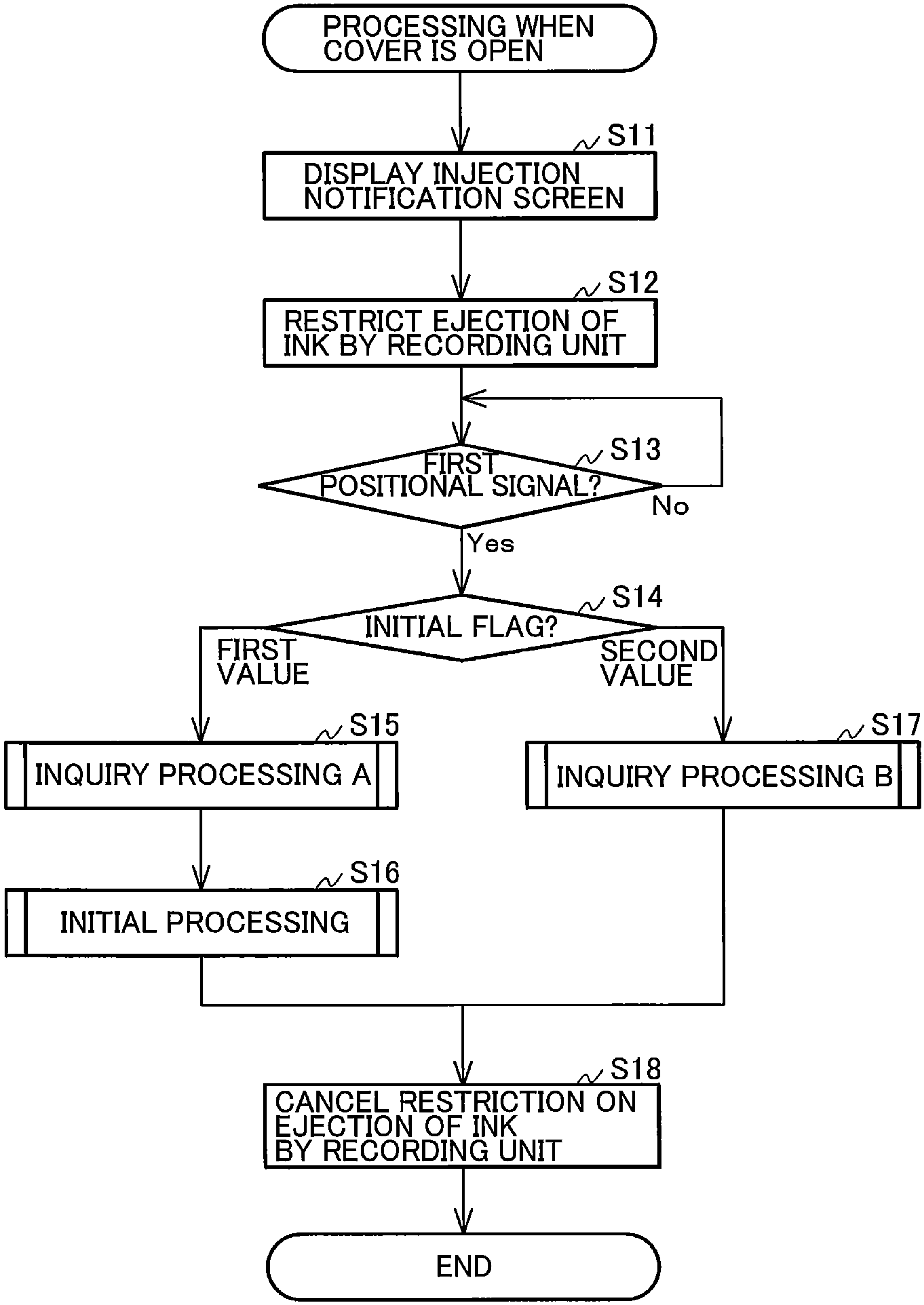
FIG. 8 is a flowchart illustrating processing performed when the cover is open.
Figure 9:
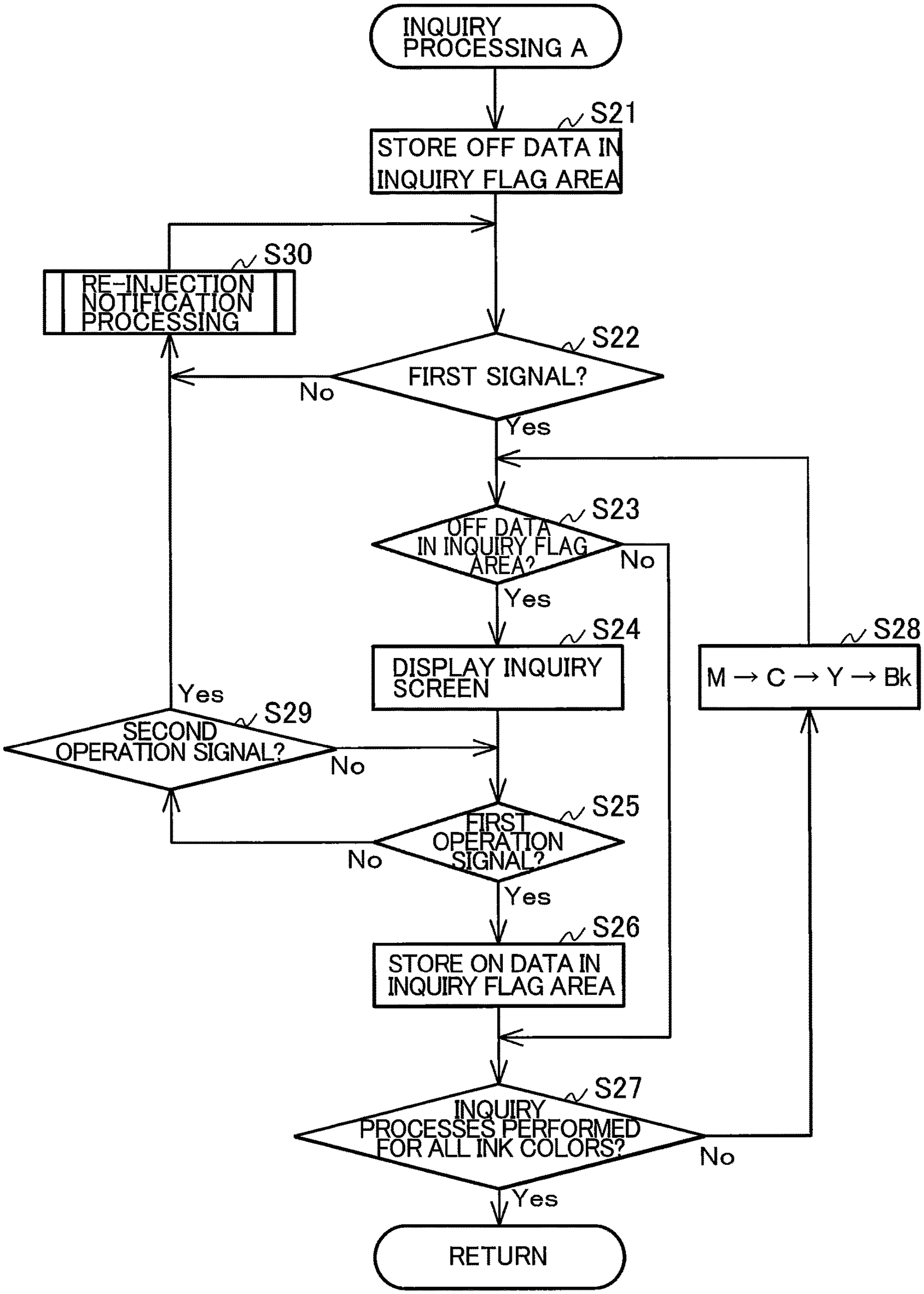
FIG. 9 is a flowchart in inquiry processing A.

First, the controller 130 performs processing illustrated in FIG. 8 in response to receipt of the second positional signal from the cover sensor 72. This processing is performed in response to, for example, the cover 70 being moved from the covered position to the exposed position while the MFP 10 is in a standby state (state in which image recording processing described later has not yet been performed). In this processing, the user is prompted to inject ink into the ink chamber 111 and is made inquiry whether ink injection into the ink chamber 111 is completed.

First, the controller 130 controls the monitor 14 to display an injection notification screen on the monitor 14 (S11). In step S11, based on the first value being stored in the initial flag area, the controller 130 controls the monitor 14 to alternately display a character string "FILL ALL INK" and a character string "THEN CLOSE INK COVER" on the monitor 14.

In step S11, based on the second value being stored in the initial flag area, the controller 130 controls the monitor 14 to display other character strings on the monitor 14 depending on the counted value stored in the EEPROM 134. Specifically, based on the counted values for all ink colors being equal to or larger than the second discharge threshold, the controller 130 controls the monitor 14 to alternately display a character string "REFILL M/C/Y/BK" and a character string "THEN CLOSE INK COVER" on the monitor 14. Based on a counted value for an ink color being smaller than the second discharge threshold, the letter representing the ink color (that is, M, C, Y, or BK, whichever is applicable, is eliminated from the character string "REFILL M/C/Y/BK". Based on the counted values for all ink colors being smaller than the second discharge threshold, the controller 130 controls the monitor 14 to display a character string "CLOSE INK COVER" on the monitor 14.

In the description below, an ink color for which the counted value is equal to or greater than the second discharge threshold may be referred to as a near-empty color, and an ink color for which the counted value is equal to or greater than the first discharge threshold may be referred to as an empty color. That is, based on the second value being stored set in the initial flag area, the processing in S11 is to indicate, on the monitor 14, a prompt to inject inks in a near-empty color and an empty color.

Processing in step S11 is an example of notification processing to indicate, on the monitor 14, a prompt to inject ink into the ink chamber 111. The controller 130 continues notification processing until the first positional signal is output from the cover sensor 72 in step S13 described later, that is, until a situation in which the cover 70 is positioned at the covered position is detected. In notification processing, it may be allowed that a different character string is displayed on the monitor 14 depending on the state of the MFP 10. This is also true for steps S24, S31, S33, S41, S45, S71, and S73 described later.

The controller 130 also restricts the ejecting of ink by the recording head of the recording unit 24 (S12). Specifically, even if the controller 130 receives a recording instruction described later during a time between steps S12 and S18, the controller 130 does not start image recording processing illustrated in FIG. 12. Processing in step S12 is an example of restriction processing.

When the user views the notification screen regarding the ink injection, the user can remove the cap 113 from the injection inlet 112 and inject ink into the ink chamber 111. Upon completion of the ink injection, the user can close the injection inlet 112 with the cap 113 and can move the cover 70 to the covered position. In this case, the user may inject only ink in the ink color indicated on the notification screen regarding the ink injection, may inject inks in all colors, or may not inject ink in any color. However, the controller 130 cannot sense the ink color of the ink that has been injected.

Next, based on receipt of the first positional signal from the cover sensor 72 and the first value being stored in the initial flag area (the result in S13 is Yes and the result in S14 is the first value), the controller 130 performs inquiry processing A (S15). That is, based on the cover 70 being moved from the exposed position to the covered position in a state in which initial processing has not yet been completed in the MFP 10, the controller 130 performs inquiry processing A. Inquiry processing A will be described below in detail with reference to FIG. 9.

<Inquiry Processing Before Initial Processing>

First, the controller 130 stores off data in an inquiry flag area for each ink color (S21). The data in the inquiry flag area is temporarily stored in the RAM 133 at the time that the controller starts to perform inquiry processing A. Then, based on receipt of the first signal output from the ink sensor 125 (the result in S22 is Yes), the controller 130 performs inquiry processes (in S23 to S25 and S29) for each of the four ink colors. The first signal from the ink sensor 125 is present in step S22 in a case in which black ink injection into the ink chamber 111B has been completed. That is, if it is confirmed that at least black ink injection has been completed, the controller 130 performs inquiry processing A for each ink color.

The first positional signal in step S13 is an example of a completion signal indicating completion of the ink injection. However, specific examples of the completion signal are not limited to this. For example, the completion signal may be an operation signal output from the operation panel 17 upon receipt of a user's operation performed to indicate completion of ink injection. However, a method of checking whether black ink has been injected is not limited to a method in which a signal from the ink sensor 125 is used. Instead of the signal from the ink sensor 125, an operation signal may be used that is output from the operation panel 17 upon receipt of a user's operation performed to indicate completion of black ink injection.

Of a plurality of inquiry processes performed in turn in S23 to S25 and S29 in inquiry processing A, the inquiry process that is performed first is an example of a first inquiry process and inquiry processes performed after the first inquiry process are an example of a second inquiry process. Although an example in which these inquiry processes are performed for magenta, cyan, yellow, and black in that order will be performed, the order of the performing the inquiry processes is not limited to this. This is also true for inquiry processing B described later in S45 to S48 and S51.

Based on an inquiry flag area for magenta being stored off data (the result in S23 is Yes), the controller 130 controls the monitor 14 to display an inquiry screen for magenta on the monitor 14 (S24). The inquiry screen includes inquiry information. The inquiry information regards whether ink, in the corresponding ink color, injection is completed. Inquiry information about magenta includes, for example, a character string "DID YOU FILL" and a character string "[M]? 1. YES 2. NO". The controller 130 controls the monitor 14 to alternately display these two character strings on the monitor 14.

Next, the controller 130 waits until one of the first operation signal and second operation signal is output from the operation panel 17 (the result in S25 No and the result in S29 is No). The user's operation of pressing the button labeled 1, which is included in the numeric keypad 17A, in step S25 is an example of a first operation performed to indicate completion of the ink injection. The user's operation of pressing the button labeled 2, which is included in the numeric keypad 17A, in step S29 is an example of a second operation performed to indicate that no completion of the ink injection. The first operation and second operation are not limited to these examples. For example, if the operation panel 17 includes an upward arrow button labeled ↑ and a downward arrow button labeled t, the pressing of the ↓ button may be the first operation and the pressing of the 4 button may be the second operation.

The user's operation of pressing the power button 17B is an example of a third operation that commands performing stop processing to stop power supply to the MFP 10. Even if, however, the third operation signal is output from the operation panel 17 in inquiry processing A (the result in S25 is No and the result in S29 is No), the controller 130 continues inquiry processing A without performing the stop processing corresponding to the third operation signal. Specific examples of the third operation are not limited to this. The third operation only needs to be different from the first operation and second operation. Other specific examples of the third operation include the pressing of buttons labeled 4 to 9, which are included in the numeric keypad 17A, the pressing of a COPY button, and the pressing of a SCAN button. Even if these buttons are pressed in inquiry processing A, the controller 130 ignores the operation signals corresponding to these pressed buttons and continues inquiry processing A.

Based on receipt of the first operation signal from the operation panel 17 (the result in S25 is Yes), the controller 130 initializes the counted value for magenta and stored on data in the inquiry flag area for magenta (S26). Processing to initialize the counted value in step S26 is an example of initializing processing.

Based on the inquiry processes have not yet been performed for all ink colors (the result in S27 is No), the controller 130 performs the inquiry processes for a next ink color (the sequence proceeds to 528, returns to S23 to S25, and proceeds to S29). Based on the inquiry processes have been performed for all ink colors (the result in S27 is Yes), the controller 130 terminates inquiry processing A.

Figure 10:
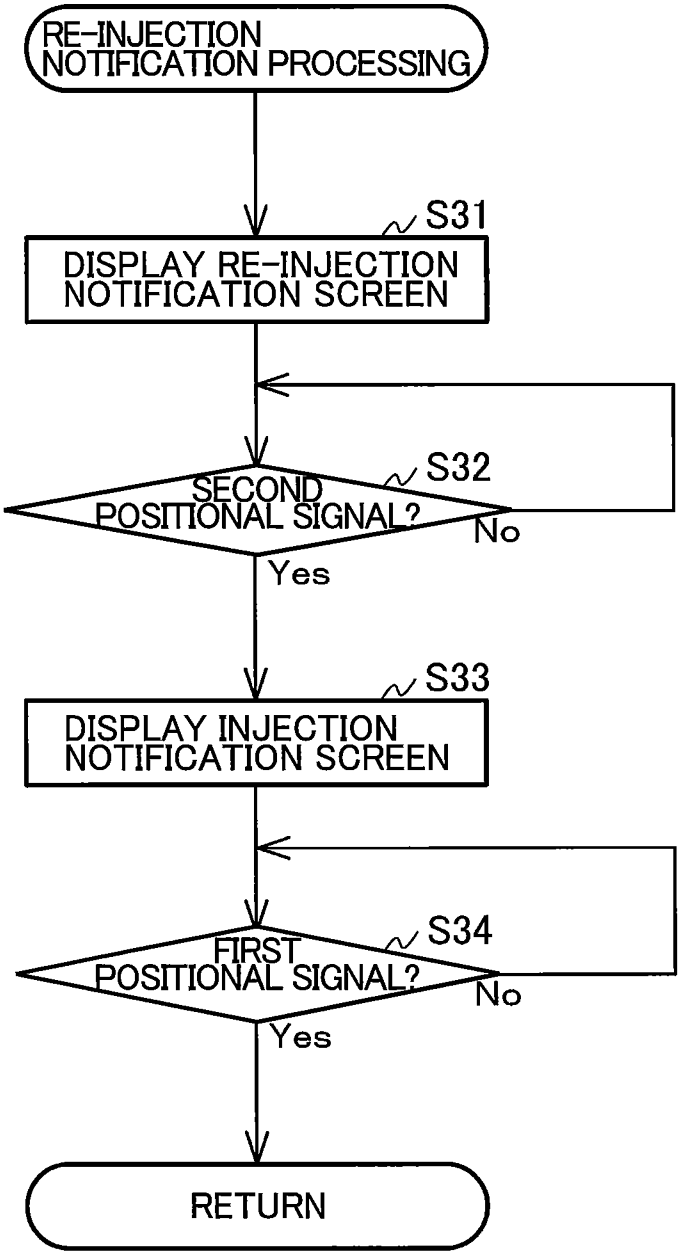
FIG. 10 is a flowchart in re-injection notification processing.
Figure 11:
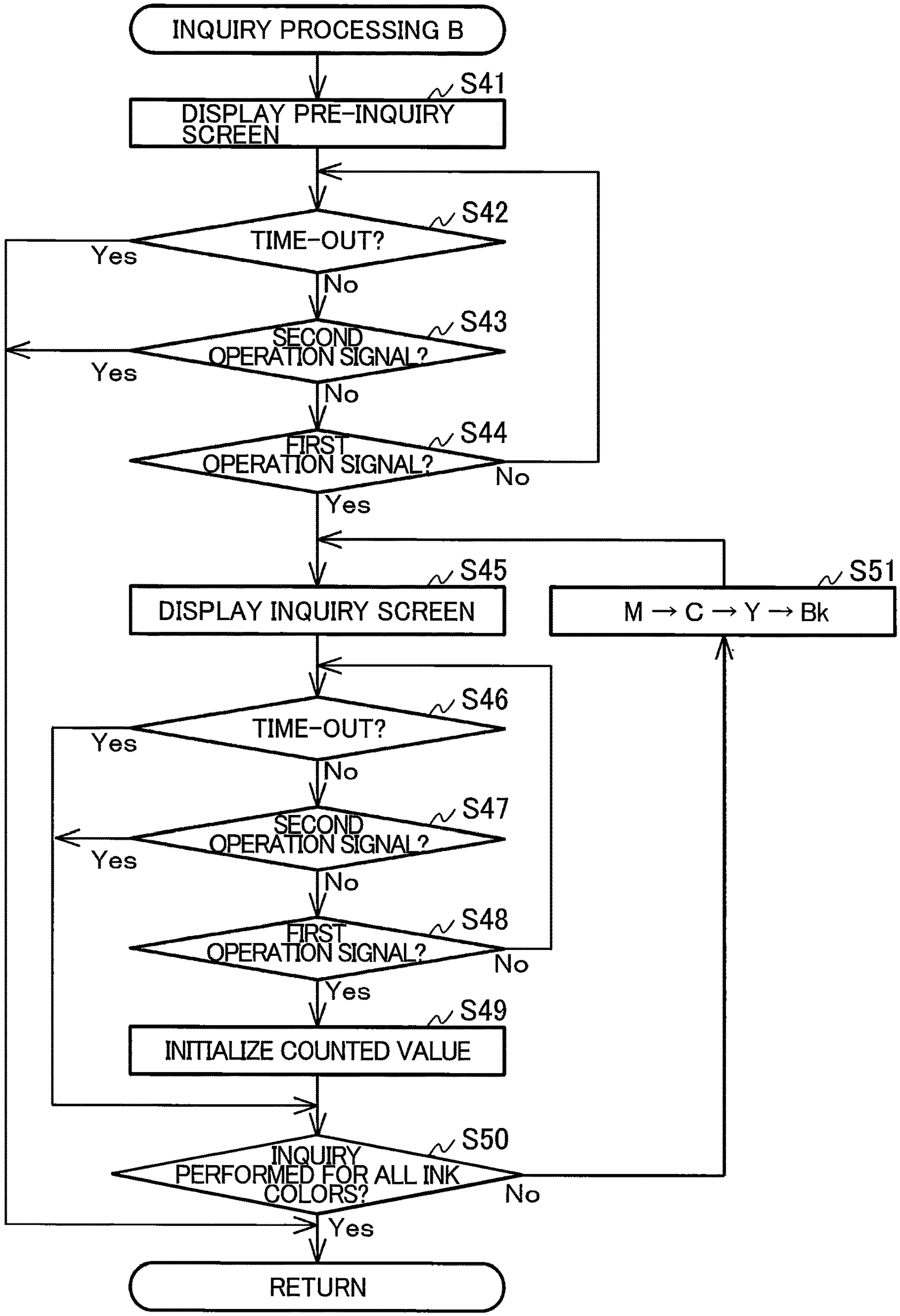
FIG. 11 is a flowchart in inquiry processing B.

Based on receipt of the second signal from the ink sensor 125 in step S22 (the result in S22 is No), the controller 130 performs re-injection notification processing illustrated in FIG. 10 (S30). Similarly, based on no receipt of the first operation signal from the operation panel 17 in step S25 (the result in S25 is No) and receipt of the second operation signal from the operation panel 17 in step S29 (the result in S29 is Yes), the controller 130 suspends the inquiry process in progress and performs re-injection notification processing (S30). In re-injection notification processing, the user is promoted to move the cover 70 to the exposed position and inject ink.

In re-injection notification processing illustrated in FIG. 10, the controller 130 controls the monitor 14 to display a re-injection notification screen on the monitor 14 (S31). The re-injection notification screen includes, for example, a character string "FILL INK" and a character string "OPEN INK COVER". The controller 130 alternately controls the monitor 14 to display these two character strings on the monitor 14. Processing to display the re-injection notification screen is an example of re-notification processing to indicate, on the monitor 14, a prompt to move the cover 70 to the exposed position and supply the corresponding ink.

Next, the controller 130 waits until the cover 70 is moved to the exposed position, in other words, waits until the controller 130 receivers the second positional signal from the cover sensor 72 (the result in S32 is No). At the same time, the controller 130 keeps the re-injection notification screen displayed (S31). In response to receipt of the second positional signal from the cover sensor 72 in step S32, processing in S33 and later is performed, instead of processing illustrated in FIG. 8. In response to receipt of the second positional signal from the cover sensor 72 (the result in S32 is Yes), the controller 130 controls the monitor 14 to display the injection notification screen on the monitor 14 as in step S11 (S33). Next, the controller 130 waits until the cover 70 is moved to the covered position, in other words, waits until the controller 130 receives the first positional signal from the cover sensor 72 (the result in S34 is No). At the same time, the controller 130 keeps the injection notification screen displayed (S33). In response to receipt of the first positional signal from the cover sensor 72 (the result in S34 is Yes), the controller 130 terminates re-injection notification processing and performs processing indicated in step S22 and later again.

The inquiry processes for other ink colors (S23 to S25 and S29) are also performed in the same way. In inquiry information for another ink color, for example, the letter corresponding to the other ink color (that is, C, Y, or BK, whichever is applicable) is placed at the position of [M] described above instead. In response to receipt of the first operation signal from the operation panel 17 in the inquiry process for the other ink color (the result in S25 is Yes), the controller 130 initializes the counted value for the other ink color and stores on data in the inquiry flag area for the other ink color (S26).

Based on the on data being stored in the inquiry flag area in S23 (the result in S23 is No), the controller 130 performs processing indicated in step S27 and later without performing steps S24 to S26 and S29. Based on, for example, the button labeled 1 being pressed in the inquiry processes for magenta and the button labeled 2 being pressed in the inquiry processes for cyan, after re-injection notification processing, the controller 130 performs the inquiry processes for cyan without performing the inquiry processes for magenta.

Although not illustrated, in response to receipt of the second positional signal from the cover sensor 72 during performing an inquiry process (specifically, while the controller 130 is waiting for receipt of the first operation or second operation), the controller 130 may suspend the inquiry process and may control the monitor 14 to display the injection notification screen on the monitor 14 again. Then, in response to receipt of the first positional signal from the cover sensor 72, the controller 130 may restart the suspended inquiry process.

Referring again to FIG. 8, the controller 130 performs initial processing (S16). Specifically, the controller 130 controls a pump (not illustrated) to suck air and ink included in the flow path extending from the ink chamber 111 to the recording head of the recording unit 24. The controller 130 also stores the second value in the initial flag area in EEPROM 134. The controller 130 then cancels the restriction on the ejection of ink by the recording head of the recording unit 24 (S18). That is, if the controller 130 receives a recording instruction after step S18, the controller 130 can perform image recording processing illustrated in FIG. 12. Processing in step S18 is an example of cancelling processing to cancel a restriction in restriction processing.

Based on receipt of the first positional signal from the cover sensor 72 and the second value is stored in the initial flag in EEPROM 134 (the result in S13 is Yes and the result in S14 is the second value), the controller 130 performs inquiry processing B (S17). That is, if the cover 70 is moved from the exposed position to the covered position in a state in which initial processing has been already performed in the MFP 10, inquiry processing B is performed. Inquiry processing B will be described below in detail with reference to FIG. 11. However, detailed descriptions common to inquiry processing A and inquiring processing B will be omitted and differences between them will be mainly described.

<Inquiry Processing after Initial Processing>

First, the controller 130 controls the monitor 14 to display a pre-inquiry screen on the monitor 14 (S41). The pre-inquiry screen includes, for example, a character string "DID YOU REFILL" and a character string "INK? 1. YES 2. NO". The controller 130 controls the monitor 14 to alternately display these two character strings on the monitor 14. In addition, the controller 130 starts a timer for monitoring a threshold time in step S41.

Next, the controller 130 waits until the controller receives one of the first operation signal and second operation signal from the operation panel 17 (the result in S43 is No and the result in S44 is No) before the timer times out (the result in S42 is No). In response to occurring the a time-out, that is, a time elapsed from the start of the timer reaches the threshold time (the result in S42 is Yes) or in response to receipt of the second operation signal from the operation panel 17 before the timer times out (the result in S43 is Yes), the controller 130 terminates inquiry processing B.

In response to receipt of the first operation signal from the operation panel 17 (the result in S44 is Yes) without receipt of the second operation signal from the operation panel 17 (the result in S43 is No) before the timer times out (the result in S42 is No), the controller 130 performs processing indicated in step S45 and later. In response to receipt of one of the first operation signal and second operation signal from the operation panel 17 (the result S43 is Yes or the result in S44 is Yes), the controller 130 cancels the timer that has been started in step S41.

Next, the controller 130 controls the monitor 14 to display the inquiry screen for magenta on the monitor 14 (S45). Processing in step S45 is almost the same as processing in step S24. Step S45 differs from step S24 only in that the inquiry screen in step S45 includes a character string "DID YOU REFILL" instead of the character string "DID YOU FILL". The controller 130 also starts a timer for monitoring a threshold time in step S45. The controller 130 waits until the controller 130 receives one of the first operation signal and second operation signal from the operation panel 17 (the result in S47 is No and the result in S48 is No) before the timer times out (the result in S46 is No), as in steps S42 to S44. The threshold time monitored by the timer in step S46 may be the same as the threshold time monitored by the timer in step S42 or may differ from it.

In response to receipt of the first operation signal from the operation panel 17 (the result in S48 is Yes) without receipt of the second operation signal from the operation panel 17 (the result in S47 is No) before the timer times out (the result in S46 is No), the controller 130 initializes the counted value for magenta (S49). Processing in step S49 is an example of initializing processing. In response to a time elapsed from the start of the timer reaching the threshold time (the result in S46 is Yes) or in response to receipt of the second operation signal from the operation panel 17 (the result in S47 is Yes) before the timer times out, the controller 130 performs processing indicated in step S50 and later without performing processing indicated in step S49. In response to receipt of one of the first operation signal and second operation signal from the operation panel 17 (the result S47 is Yes or the result in S48 is Yes), the controller 130 cancels the timer that has been started in step S46.

Based on that the inquiry processes have not yet been performed for all ink colors (the result in S50 is No), the controller 130 performs the inquiry processes for a next ink color (the sequence proceeds to S51 and returns to S45 to S48). Based on that the inquiry processes have been performed for all ink colors (the result in S50 is Yes), the controller 130 terminates inquiry processing B. Furthermore, the controller 130 cancels the restriction on the ejecting ink by the recording head of the recording unit 24 (S18).

Unlike inquiry processing A, in response to that the power button 17B is pressed, that is, in response to receipt of the third operation signal from the operation panel 17 in inquiry processing B, the controller 130 terminates inquiry processing B and performs the stop processing described above. However, even if one of the buttons labeled 4 to 9, which are included in the numeric keypad 17A, the COPY button, or the SCAN button is pressed in inquiry processing B, the controller 130 ignores the operation signal corresponding to the pressed button and continues inquiry processing B, as in inquiry processing A.

<Image Recording Processing>

Figure 12:
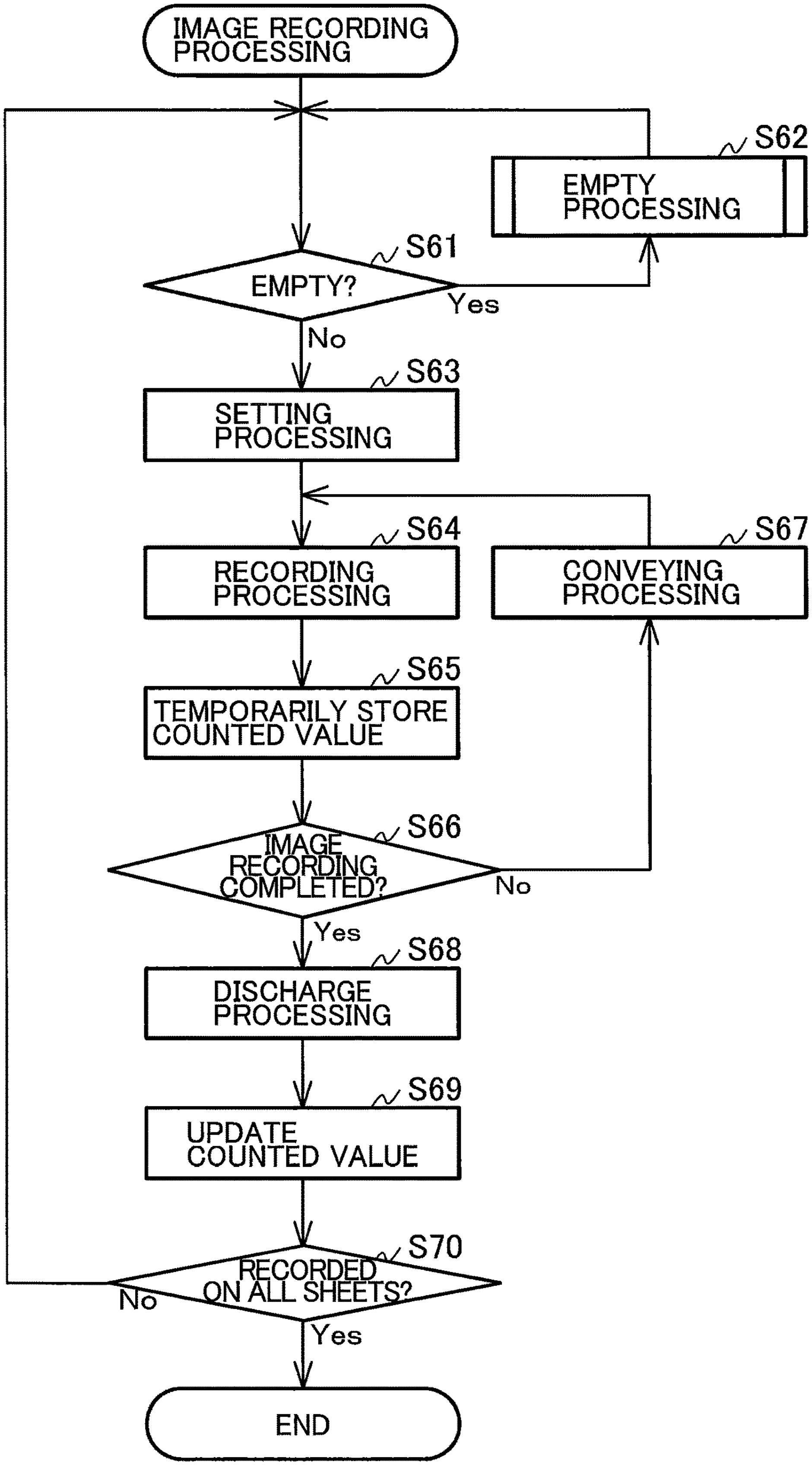
FIG. 12 is a flowchart in image recording processing.
Figure 13:
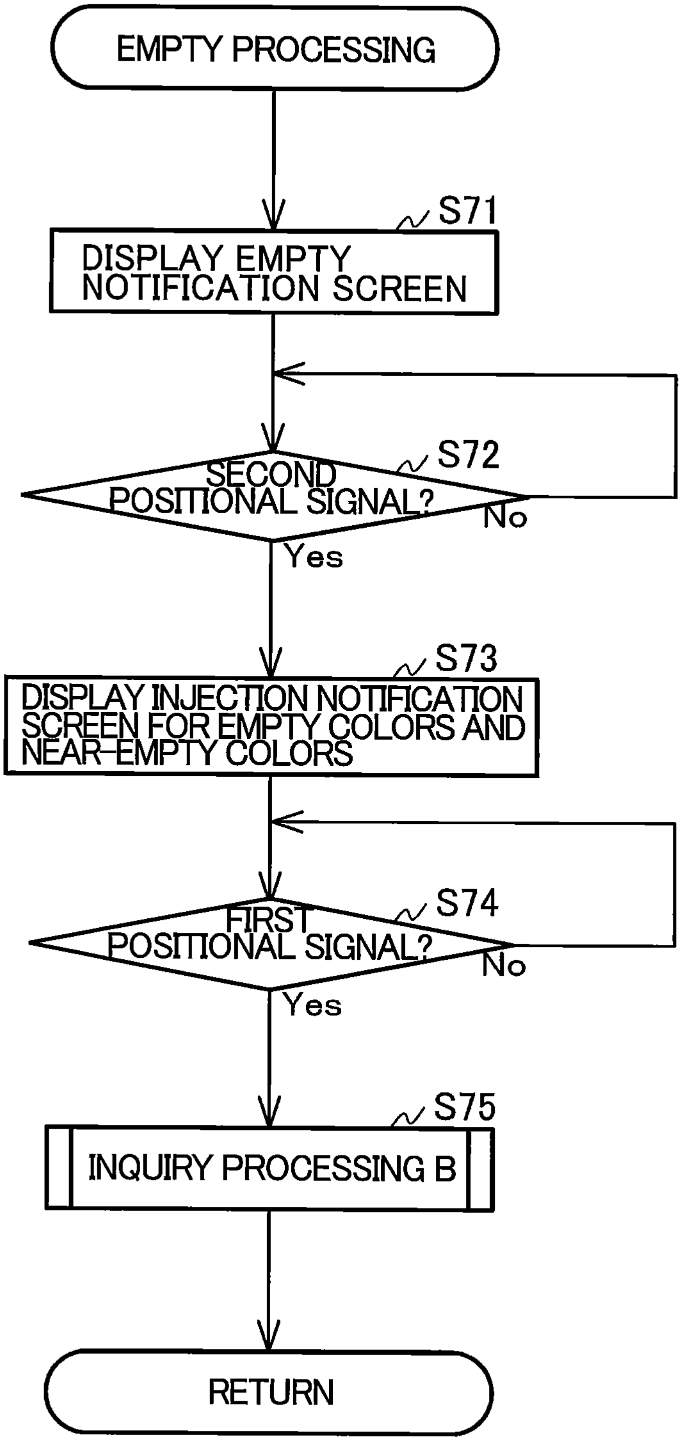
FIG. 13 is a flowchart in empty processing.

Next, based on receipt of a recording instruction through the communication interface 25, the controller 130 performs image recording processing illustrated in FIG. 12. However, even if the controller 130 receives a recording instruction with the first value stored in the initial flag area or during performing inquiry processing B, the controller 130 does not perform image recording processing. Image recording processing intended to be performed based on the recording instruction is performed based on the second value being stored in the initial flag area or after inquiry processing B is completed.

The recording instruction is an instruction to have the MFP 10 perform image recording processing in which an image indicated by image data is recorded on a sheet. There is no particular limitation on a source from which the recording instruction is received. For example, the recording instruction may be received from the user through the operation panel 17 or from an external apparatus through the communication interface 25. The recording instruction may be an instruction that instructs the recording of an image indicated by facsimile data on a sheet.

First, based on at least one of the counted values corresponding to the four ink colors being equal or larger than the first discharge threshold (the result in S61 is Yes), the controller 130 performs empty processing (S62). In empty processing, the user is prompted to inject ink in a color if its remaining amount is small. Empty processing will be described below with reference to FIG. 13.

First, the controller 130 controls the monitor 14 to display an empty notification screen on the monitor 14 (S71). Processing in step S71 is an example of processing to indicate, on the monitor 14, that the remaining amounts of ink in empty colors are small. The empty notification screen includes a character string "CANNOT PRINT" and at least one of a character string "REFILL [BK] INK", a character string "REFILL [Y] INK", a character string "REFILL [C] INK", and a character string "REFILL [M] INK" in correspondence to empty colors. The controller 130 controls the monitor 14 to alternately display, on the monitor 14, "CANNOT PRINT" and at least one of "REFILL [BK] INK", "REFILL [Y] INK", "REFILL [C] INK", and "REFILL [M] INK" in correspondence to empty colors as character strings on the empty notification screen.

Based on, for example, the counted values for magenta and black being equal to or greater than the first discharge threshold and the counted values for cyan and yellow being smaller than the first discharge threshold, the controller 130 controls the monitor 14 to display the character string "CANNOT PRINT", the character string "REFILL [M] INK", and the character string "REFILL [BK] INK" in turn on the monitor 14 in step S51. When the user views the empty notification screen, the user can move the cover 70 to the exposed position to inject the corresponding inks into the ink tank 100.

Next, the controller 130 waits until the cover 70 is moved to the exposed position, in other words, waits until the controller 130 receives the second positional signal from the cover sensor 72 (the result in S72 is No). At the same time, the controller 130 keeps the empty notification screen displayed (S71). In response to receipt of the second positional signal from the cover sensor 72 in step S72, processing in step S73 and later is performed instead of processing illustrated in FIG. 8. In response to receipt of the second positional signal from the cover sensor 72 (the result in S72 is Yes), the controller 130 controls the monitor 14 to display the injection notification screen for empty colors and near-empty colors on the monitor 14 (S73). Processing in S73 is the same as processing in step S11. Processing in step S73 is an example of processing to indicate, on the monitor 14, a prompt to inject inks in near-empty colors and empty colors.

Based on, in the example described above, the counted value for yellow being equal to or greater than the second discharge threshold and the counted value for cyan being smaller than the second discharge threshold, the controller 130 controls the monitor 14 to alternately display a character string "REFILL M/Y/BK" and a character string "THEN CLOSE INK COVER" on the monitor 14. When the user views the injection notification screen, the user can inject the corresponding ink into the ink chamber 111 and can move the cover 70 to the covered position.

Next, the controller 130 waits until the cover 70 is moved to the covered position, in other words, waits until the controller 130 receives the first positional signal from the cover sensor 72 (the result in S74 is No). At the same time, the controller 130 keeps the injection notification screen displayed (S73). In response to receipt of the first positional signal from the cover sensor 72 (the result in S74 is Yes), the controller 130 performs inquiry processing B illustrated in FIG. 11 (S75) and terminates empty processing. That is, inquiry processing B is performed when the cover 70 is moved from the exposed position to the covered position. In inquiry processing B, counted values for ink colors for which the first operation has been made are initialized. Inquiry processing B has been already described with reference to FIG. 11, so a repeated description will be omitted.

Referring again to FIG. 12, based on that there is a counted value that is equal to or greater than the first discharge threshold even after empty processing (the result in S61 is Yes), the controller 130 performs empty processing again (S62). Based on all counted values being smaller than the first discharge threshold (the result in S61 is No), the controller 130 performs setting processing (S63). In setting processing, the controller 130 controls the conveyor 23 to convey a sheet to a position at which an area in which an image is first recorded faces the recording head of the recording unit 24.

Next, the controller 130 performs recording processing (S64). In recording processing, the controller 130 controls the recording head of the recording unit 24 to eject ink. That is, an image is recorded on the sheet that has been made to face the recording head of the recording unit 24. The controller 130 also counts the amount of ink ejected from the recording head of the recording unit 24 in recording processing for each ink color and temporarily stores the counted value in the RAM 133 (S65). Steps S64 and S65 may be concurrently performed. The counted value that is temporarily stored in the RAM 133 differs from the counted value stored in the EEPROM 134.

Next, based on that image recording on the sheet has not yet been completed (the result in step S66 is No), the controller 130 performs conveying processing (S67). In conveying processing, the controller 130 controls the conveyor 23 to convey a sheet by a predetermined line feed width. The controller 130 repeatedly performs processing indicated in steps S64 to S67 until image recording on the sheet is completed (the result in step S66 is No).

Next, based on that image recording on the sheet has been completed (the result in step S66 is Yes), the controller 130 performs discharge processing (S68). In discharge processing, a sheet on which an image has been recorded is discharged to the discharge tray 21. The controller 130 then updates the counted value in the EEPROM 134 by using the counted value that is temporarily stored in the RAM 133 (S69). Processing in steps S65 and S69 is an example of count processing.

A timing at which to update the counted value is not limited to a timing at which step S69 is performed. For example, in so-called flushing processing, in which the recording head of the recording unit 24 ejects ink toward an ink receiver (not illustrated) for maintenance of the recording head of the recording unit 24, or a so-called purge processing, in which a pump (not illustrated) sucks ink in the recording head of the recording unit 24, the amount of ink ejected or discharged from the recording head of the recording unit 24 in the flushing processing or purge processing may be added to the corresponding counted value.

The controller 130 then repeatedly performs processing indicated in steps S61 to S69 until all images instructed by recording instructions are recorded on sheets (the result in step S70 is No). Based on all images instructed by recording instructions have been recorded on sheets (the result in step S70 is Yes), the controller 130 terminates image recording processing.

Technical Effects

As described above, in response to that the cover 70 is moved to the exposed position, the controller 130 can start processing that should be performed upon the start of the ink injection. In response to that the cover 70 is moved to the covered position, the controller 130 can start processing that should be performed upon completion of the ink injection. That is, the user's operation indicating that the ink injection has been started and the user's operation indicating that the ink injection has been completed can be simplified when compared with the conventional ink replenishment processing. In addition, all user's operations can be performed on the MFP 10, so the burden on the user can be reduced.

As described above, an input can be made individually for each ink color in each inquiry processing to indicate whether ink injection into the ink chamber is completed, suppressing an incorrect input from being made. As a result, the controller 130 can appropriately recognize the amount of ink in the ink tank 100 before performing image recording processing. The user responds to inquiries for all ink colors in turn, so the user can check the state of ink for each ink color. However, inquiry processing methods are not limited to the method described above. The inquiry processes may be concurrently performed for all ink colors.

As described above, the controller 130 can use the ink sensor 125 to sense whether ink injection into the ink chamber 111B is completed. Therefore, the controller 130 may eliminate the inquiry processes for black ink in inquiry processing A and inquiry processing B. That is, in inquiry processing A and inquiry processing B, the controller 130 only needs to inquiry at least the user whether ink injection into the ink chambers 111 to which the ink sensor 125 is not attached.

The remaining amount of ink, which is identified by a counted value, may slightly differ from the actual remaining amount of ink. In view of this situation, the ink sensor 125 is used to accurately sense that the remaining amount of black ink has fallen below the remaining amount threshold, suppressing black ink from being exhausted during image recording processing. This is particularly useful for the MFP 10 that can perform image recoding processing on facsimile data. An ink sensor may be attached to other ink chambers 111M, 111C, and 111Y as well.

As described above, based on that initial processing is performed in a state in which no ink has been injected into some ink chambers 111, ink ejected or discharged from the recording head of the recording unit 24 is wasted. In an unused MFP 10 after purchase, the ink chambers 111 are empty. In inquiry processing A, therefore, it is desirable to check, in pre-check processing, that ink injection into the ink chamber 111B is completed before the inquiry processes is performed for each color ink. If it is checked that no ink has been injected into the ink chamber 111B, it is desirable to perform re-injection notification processing to make a prompt to inject ink into all ink chambers 111.

However, the amount of ink consumed after initial processing varies depending on the ink chamber 111. During performing processing illustrated in FIG. 8, therefore, there is the possibility that ink is injected into only some ink chambers 111 and is not injected into the other ink chambers 111. In inquiry processing B, therefore, it is desirable to perform the inquiry processes for all ink colors, regardless of the signal output from the ink sensor 125, which is attached to only the ink chamber 111B for black ink.

In inquiry processing A, the second inquiry process is performed only when the controller 130 receives the first operation signal in the first inquiry process. In other words, in inquiry processing A, the controller 130 continues the first inquiry process until the controller 130 receives the first operation and the controller 130 performs the second inquiry process upon receipt of the first operation. Initial processing is performed only when the controller 130 receives the first operation signal in the inquiry processes for all ink colors. Therefore, after the magenta ink injection had been checked, for example, it is checked that cyan ink has been injected, so it can be reliably checked that inks have been injected into all ink chambers 111.

Since, as described above, the controller 130 continues the first inquiry process until the controller 130 receives the first operation, the first inquiry process is not completed by, for example, a time-out of the timer. In the example in FIG. 9, when the controller 130 receives the second operation in the first inquiry process, the first inquiry process is suspended, and after re-injection notification processing has been performed, the suspended first inquiry process is restarted. This processing flow is also considered as an example in which the first inquiry process is continued.

However, the amount of ink consumed after initial processing varies depending on the ink chamber 111. During performing processing illustrated in FIG. 8, therefore, there is the possibility that ink is injected into only some ink chambers 111 and is not injected into the other ink chambers 111. In view of this, in inquiry processing B, it is desirable to perform the second inquiry process, regardless of receipt of the operation signal output from the operation panel 17 in the first inquiry process. In addition, in inquiry processing B, processing is performed as in a case in which the second operation, by user, has been performed, in response to a time-out of the timer. This prevents a situation in which, if the user does not perform an operation for inquiry processing B, subsequent processing cannot be performed.

In inquiry processing A as described above, the controller 130 determines whether the inquiry processes specific to a particular ink color are required according to data stored in an inquiry flag area. This can prevent the inquiry processes from being performed again in re-injection notification processing for an ink color for which the inquiry processes have been completed. As a result, user's operations in inquiry processing A can be simplified. In a case as well in which the cover 70 is opened and closed during inquiry processing A, inquiry processing A may be restarted from the suspended inquiry process without performing inquiry processes that have been already performed.

In empty processing as described above, a prompt to inject ink into an empty color is indicated on the empty notification screen. When the user visually recognizes the amount of ink in each ink chamber 111, the user can also inject ink into ink chambers 111 in colors other than the empty color. In inquiry processing B, therefore, when the inquiry processes are performed for all ink colors, the controller 130 can appropriately initialize counted values corresponding to the colors of injected inks.

In empty processing as described above, when the user moves the cover 70 to the exposed position, the user is notified of a prompt to inject inks in a near-empty color and an empty color through the injection notification screen. Therefore, the user can be aware that the user should inject inks the remaining amount of which is small. This suppresses, for example, inks in different colors from being placed in the empty state in turn and thereby image recoding processing from being often suspended.

As described above, based on that there is a counted value that is equal to or greater than the first discharge threshold even after empty processing, the controller 130 does not performed processing to record an image on a sheet. In other words, in inquiry processing B for all empty colors, the controller 130 can record an image on a sheet upon receipt of the first operation. This suppresses ink from being exhausted during image recording processing. In contrast, even if the controller 130 receives the second operation during an inquiry process for a near-empty color, in other words, even if the controller 130 receives no first operation, the controller 130 can perform image recording processing. This eliminates the need to inject inks in all colors at one time.

In image recording processing as described above, the controller 130 performs empty processing before setting processing (in a case in which images are printed on a plurality of sheets, before setting processing for each sheet). However, even if a counted value reaches the first discharge processing while an image is being recorded on a sheet (S63 to S67), the controller 130 does not perform empty processing. This suppresses image recording on a sheet from being suspended in the middle of the recording. Even if the counted value reaches the first discharge processing, the controller 130 continues performing the image recording by using ink retained in the spare retaining chamber.

In the ink tank 100 as described above, the spare retaining chamber is disposed at a position at which the user cannot easily view (at a position distant from the front wall 101 and below the upper-stage wall 145). When the user views the ink tank 100, therefore, it is possible to have the user recognize inks in near-empty colors and empty colors as having been completely exhausted. This can further prompt the user to inject inks in near-empty colors and empty colors.

What is claimed is:

1. An inkjet recording apparatus comprising:

an injection inlet;

an ink chamber associated with the injection inlet;

a recording head configured to eject ink retained in the ink chamber;

a cover movable between a covered position and an exposed position, the cover at the exposed position being farther away from the injection inlet than the cover at the covered position is from the injection inlet;

a monitor;

a cover sensor positioned to sense a movement of the cover;

an operation panel configured to receive user input; and a controller configured to:

in a state where the cover is at the exposed position, control the monitor to display a first notification on the monitor, the first notification including a prompt to inject ink into the ink chamber through the injection inlet and move the cover to the covered position;

after displaying the first notification, in a state where the cover is at the covered position, control the monitor to display a second notification on the monitor, the second notification including inquiry information regarding whether ink has been injected into the ink chamber through the injection inlet; and control the operation panel to allow receipt at the operation panel of a response to the inquiry information in the second notification.

2. The inkjet recording apparatus according to claim 1, wherein the ink chamber is configured to retain therein ink of a first kind injected through the injection inlet, wherein the inkjet recording apparatus further comprises:

a second injection inlet; and a second ink chamber associated with the second injection inlet, the second ink chamber being configured to retain therein ink of a second kind injected through the second injection inlet, and wherein the inquiry information in the second notification is regarding whether ink of the first kind and ink of the second kind have been injected into the ink chamber and the second ink chamber, respectively.

3. The inkjet recording apparatus according to claim 2, wherein the controller is configured to:

based on receipt at the operation panel of a prescribed response indicating that ink of the first kind and ink of the second kind have been injected into the ink chamber and the second ink chamber, respectively, perform initial processing to fill a flow path from the ink chamber to the recording head with ink of the first kind and fill a second flow path from the second ink chamber to the recording head with ink of the second kind, and enable the recording head to perform ejection of ink of the first kind and ink of the second kind.

4. The inkjet recording apparatus according to claim 1, wherein the controller is configured to:

before controlling the monitor to display the first notification on the monitor, in the state where the cover is at the covered position, control the monitor to display a notification including a prompt to open the cover and inject ink into the ink chamber through the injection inlet.

5. The inkjet recording apparatus according to claim 1, wherein the controller is configured to:

based on receipt at the operation panel of a prescribed response indicating that ink has been injected into the ink chamber through the injection inlet, initialize a count value indicative of an amount of ink ejected from the recording head.

6. The inkjet recording apparatus according to claim 3, wherein the controller is configured to:

judge whether a first count value indicative of an amount of ink of the first kind ejected from the recording head reaches a first prescribed threshold and whether a second count value indicative of an amount of ink of the second kind ejected from the recording head reaches a second prescribed threshold;

based on a judgment result indicating that one of the first count value and the second count value reaches a corresponding prescribed threshold and that the other one of the first count value and the second count value does not reach a corresponding prescribed threshold, control the monitor to display a third notification on the monitor, the third notification including information indicating that an amount of ink of the one of the first kind and the second kind retained in a corresponding ink chamber is small;

after displaying the third notification, in the state where the cover is at the covered position:

control the monitor to display a first inquiry regarding injection of ink of the first kind into the first ink chamber, and control the operation panel to allow receipt at the operation panel of a response to the first inquiry; and control the monitor to display a second inquiry regarding injection of ink of the second kind into the second ink chamber, and control the operation panel to allow receipt at the operation panel of a response to the second inquiry.

7. The inkjet recording apparatus according to claim 6, wherein the controller is configured to:

after controlling the monitor to display the third notification and before controlling the monitor to display the first inquiry, in the state where the cover is at the covered position, control the monitor to display a fourth notification on the monitor, the fourth notification including inquiry information regarding whether ink of at least one of the first kind and the second kind has been injected into a corresponding ink chamber through a corresponding injection inlet; and control the operation panel to allow receipt at the operation panel of a response to the inquiry information in the fourth notification, and wherein the controller is configured to control the monitor to display the first inquiry based on receipt at the operation panel of a response indicating that ink of the at least one of the first kind and the second kind has been injected into the corresponding ink chamber.

* * * * *